(12) United States Patent
Caterino et al.

(10) Patent No.: US 10,742,630 B2
(45) Date of Patent: *Aug. 11, 2020

(54) METHOD AND APPARATUS FOR MAKING A DECISION ON A CARD

(71) Applicant: Assa Abloy AB, Stockholm (SE)

(72) Inventors: Mark Anthony Caterino, Prospect, CT (US); Fredrik Carl Stefan Einberg, Huddinge (SE); Philip Hoyer, Richmond (GB); Daniel Berg, Sundbyberg (SE); Masha Leah Davis, Austin, TX (US); Robert Wamsley, Golden, CO (US); Tam Hulusi, Santa Ana, CA (US)

(73) Assignee: Assa Abloy AB, Stockholm (SE)

( * ) Notice: Subject to any disclaimer, the term of this patent is extended or adjusted under 35 U.S.C. 154(b) by 88 days.

This patent is subject to a terminal disclaimer.

(21) Appl. No.: 15/990,178

(22) Filed: May 25, 2018

(65) Prior Publication Data

US 2018/0270214 A1    Sep. 20, 2018

Related U.S. Application Data

(63) Continuation of application No. 15/143,993, filed on May 2, 2016, now Pat. No. 9,985,950, which is a
(Continued)

(51) Int. Cl.
*H04L 29/06* (2006.01)
*G06F 21/00* (2013.01)
(Continued)

(52) U.S. Cl.
CPC .............. *H04L 63/08* (2013.01); *G06F 21/00* (2013.01); *G06F 21/31* (2013.01); *G06F 21/34* (2013.01);
(Continued)

(58) Field of Classification Search
None
See application file for complete search history.

(56) References Cited

U.S. PATENT DOCUMENTS 4,727,368 A * 2/1988 Larson .................... G07C 1/32
235/382
5,204,663 A    4/1993 Lee
(Continued)

FOREIGN PATENT DOCUMENTS

EP    0829828    3/1998
EP    1103922    5/2001
(Continued)

OTHER PUBLICATIONS

Esato—"Nokia Launches NFC Shell for Mobile Payments" http://www.esato.com/news/article.php/id=436 (Feb. 25, 2005) (3 pages).
(Continued)

*Primary Examiner* — Kaveh Abrishamkar
(74) *Attorney, Agent, or Firm* — Fish & Richardson P.C.

(57) ABSTRACT

Method and devices for making access decisions in a secure access network are provided. The access decisions are made by one or more portable credentials using data and algorithms stored on or received by two or more credentials. Since access decisions are made by the portable credential or credentials, non-networked hosts or local hosts can be employed that do not necessarily need to be connected to a central access controller or database, thereby reducing the cost of building and maintaining the secure access network.

20 Claims, 11 Drawing Sheets

Related U.S. Application Data continuation-in-part of application No. 14/017,065, filed on Sep. 3, 2013, now Pat. No. 10,339,292, which is a continuation of application No. 13/274,863, filed on Oct. 17, 2011, now Pat. No. 8,578,472, which is a continuation of application No. 11/778,145, filed on Jul. 16, 2007, now Pat. No. 8,074,271.

(60) Provisional application No. 62/167,172, filed on May 27, 2015, provisional application No. 60/821,897, filed on Aug. 9, 2006.

(51) Int. Cl.
| | | |
|---|---|---|
| *G06F 21/31* | (2013.01) | |
| *G06F 21/34* | (2013.01) | |
| *G06F 21/35* | (2013.01) | |
| *G07C 9/23* | (2020.01) | |
| *G07C 9/29* | (2020.01) | |
| *G07C 9/25* | (2020.01) | |
| *H04W 12/06* | (2009.01) | |
| *G07C 9/27* | (2020.01) | |

(52) U.S. Cl.
CPC ............ *G06F 21/35* (2013.01); *G07C 9/23* (2020.01); *G07C 9/257* (2020.01); *G07C 9/29* (2020.01); *H04L 63/10* (2013.01); *H04L 63/101* (2013.01); G07C 9/27 (2020.01); H04L 63/0853 (2013.01); H04L 2463/082 (2013.01); H04W 12/06 (2013.01)

(56) References Cited

U.S. PATENT DOCUMENTS

| | | | |
|---|---|---|---|
| 5,678,200 | A | 10/1997 | Levi |
| 5,903,845 | A | 5/1999 | Buhrmann et al. |
| 6,095,416 | A | 8/2000 | Grant et al. |
| 6,216,227 | B1 | 4/2001 | Goldstein |
| 6,257,486 | B1 | 7/2001 | Teicher et al. |
| 6,374,356 | B1 | 4/2002 | Daigneault et al. |
| 6,577,299 | B1 | 6/2003 | Schiller et al. |
| 6,624,739 | B1 | 9/2003 | Stobbe |
| 6,668,322 | B1 | 12/2003 | Wood et al. |
| 6,719,200 | B1 | 4/2004 | Wiebe |
| 6,766,450 | B2 | 7/2004 | Micali |
| 6,859,650 | B1 | 2/2005 | Ritter |
| 6,895,234 | B1 | 5/2005 | Laursen et al. |
| 7,012,503 | B2 | 3/2006 | Nielsen |
| 7,114,179 | B1 | 9/2006 | Ritter et al. |
| 7,190,948 | B2 | 3/2007 | Donley et al. |
| 7,197,767 | B2 | 3/2007 | Kusakabe et al. |
| 7,205,882 | B2 | 4/2007 | Libin |
| 7,308,254 | B1 | 12/2007 | Rissanen |
| 7,363,252 | B2 | 4/2008 | Fujimoto |
| 7,376,839 | B2 | 5/2008 | Carta et al. |
| 7,380,279 | B2 | 5/2008 | Prokupets et al. |
| 7,600,129 | B2 | 10/2009 | Libin et al. |
| 7,616,091 | B2 | 11/2009 | Libin |
| 7,698,566 | B1 | 4/2010 | Stone |
| 7,706,778 | B2 | 4/2010 | Lowe |
| 7,716,486 | B2 | 5/2010 | Libin et al. |
| 7,730,126 | B2 | 6/2010 | Crawford |
| 7,775,429 | B2 | 8/2010 | Radicella et al. |
| 7,822,989 | B2 | 10/2010 | Libin et al. |
| 7,823,193 | B2 | 10/2010 | Ritter et al. |
| 7,873,989 | B2 | 1/2011 | Karkas et al. |
| 8,074,271 | B2 * | 12/2011 | Davis ............... H04L 63/08 726/16 |
| 8,150,374 | B2 | 4/2012 | Lowe |
| 8,572,705 | B2 | 10/2013 | Ritter et al. |
| 8,578,472 | B2 * | 11/2013 | Davis ............... H04L 63/08 726/16 |
| 8,710,962 | B2 | 4/2014 | Menzel |
| 9,396,321 | B2 | 7/2016 | Davis et al. |
| 9,443,362 | B2 | 9/2016 | Singh |
| 9,483,631 | B2 | 11/2016 | Lowe |
| 9,552,466 | B2 | 1/2017 | Lowe |
| 9,594,889 | B2 | 3/2017 | Lowe |
| 9,672,345 | B2 | 6/2017 | Davis et al. |
| 9,710,625 | B2 | 6/2017 | Lowe |
| 9,721,076 | B2 | 8/2017 | Lowe |
| 9,760,705 | B2 | 9/2017 | Davis et al. |
| 9,767,267 | B2 | 9/2017 | Davis et al. |
| 9,985,950 | B2 * | 5/2018 | Caterino ............ H04L 63/08 |
| 10,339,292 | B2 * | 7/2019 | Davis ............... G06F 21/34 |
| 2001/0018660 | A1 | 8/2001 | Sehr |
| 2002/0031228 | A1 | 3/2002 | Karkas et al. |
| 2002/0035515 | A1 | 3/2002 | Moreno |
| 2002/0143855 | A1 | 10/2002 | Traversat et al. |
| 2002/0180582 | A1 | 12/2002 | Nielsen |
| 2003/0023874 | A1 | 1/2003 | Prokupets et al. |
| 2003/0151493 | A1 | 8/2003 | Straumann et al. |
| 2003/0160681 | A1 | 8/2003 | Menard |
| 2003/0163686 | A1 | 8/2003 | Ward et al. |
| 2003/0179073 | A1 | 9/2003 | Ghazarian |
| 2003/0189096 | A1 | 10/2003 | Markkanen et al. |
| 2003/0190887 | A1 | 10/2003 | Hook et al. |
| 2003/0216143 | A1 | 11/2003 | Rose et al. |
| 2004/0015477 | A1 | 1/2004 | Beck |
| 2004/0017929 | A1 | 1/2004 | Bramblet et al. |
| 2004/0039916 | A1 | 2/2004 | Aldis et al. |
| 2004/0049675 | A1 | 3/2004 | Micali et al. |
| 2004/0050930 | A1 * | 3/2004 | Rowe ............... G06K 7/0008 235/380 |
| 2004/0059590 | A1 | 3/2004 | Mercredi et al. |
| 2004/0078594 | A1 * | 4/2004 | Scott ............... H04L 63/0428 726/35 |
| 2004/0083212 | A1 | 4/2004 | Palmquist |
| 2004/0117617 | A1 | 6/2004 | Geller et al. |
| 2004/0130437 | A1 * | 7/2004 | Stevens ............. G06Q 20/341 340/5.72 |
| 2004/0153767 | A1 | 8/2004 | Dolgonos |
| 2004/0167881 | A1 | 8/2004 | Masuka |
| 2004/0177270 | A1 | 9/2004 | Little et al. |
| 2004/0180646 | A1 | 9/2004 | Donley et al. |
| 2004/0203409 | A1 | 10/2004 | Swan |
| 2004/0229560 | A1 | 11/2004 | Maloney |
| 2005/0033962 | A1 | 2/2005 | Libin et al. |
| 2005/0055562 | A1 | 3/2005 | Guthery |
| 2005/0055567 | A1 | 3/2005 | Libin et al. |
| 2005/0063027 | A1 | 3/2005 | Durst, Jr. et al. |
| 2005/0149443 | A1 | 7/2005 | Torvinen |
| 2005/0174214 | A1 | 8/2005 | Ocana |
| 2005/0178833 | A1 | 8/2005 | Kisliakov |
| 2005/0198318 | A1 | 9/2005 | Von Mueller et al. |
| 2005/0206499 | A1 | 9/2005 | Fisher |
| 2005/0271250 | A1 | 12/2005 | Vallone et al. |
| 2006/0049255 | A1 | 3/2006 | von Mueller et al. |
| 2006/0052091 | A1 | 3/2006 | Onyon et al. |
| 2006/0164235 | A1 * | 7/2006 | Gounder ............. E05B 83/02 340/539.13 |
| 2006/0165060 | A1 | 7/2006 | Dua |
| 2006/0167871 | A1 | 7/2006 | Sorenson |
| 2006/0170533 | A1 | 8/2006 | Chioiu et al. |
| 2006/0182661 | A1 * | 8/2006 | Aquila ............... B60K 28/063 422/84 |
| 2006/0224901 | A1 | 10/2006 | Lowe |
| 2007/0067400 | A1 | 3/2007 | Kawakami et al. |
| 2007/0189532 | A1 | 8/2007 | Onozu et al. |
| 2007/0200665 | A1 | 8/2007 | Studerus |
| 2007/0290789 | A1 | 12/2007 | Segev et al. |
| 2008/0107269 | A1 | 5/2008 | Gehrmann et al. |
| 2008/0163361 | A1 | 7/2008 | Davis et al. |
| 2008/0211620 | A1 | 9/2008 | Willgert |
| 2009/0088077 | A1 | 4/2009 | Brown et al. |
| 2009/0139142 | A1 | 6/2009 | Li |
| 2009/0153291 | A1 | 6/2009 | Larson et al. |
| 2009/0183541 | A1 | 7/2009 | Sadighi et al. |
| 2009/0259838 | A1 | 10/2009 | Lin |
| 2010/0042954 | A1 | 2/2010 | Rosenblatt et al. |
| 2010/0077466 | A1 | 3/2010 | Lowe |
| 2010/0106773 | A1 | 4/2010 | Tsutazawa et al. |
| 2010/0245033 | A1 | 9/2010 | Sasakuma |

(56) References Cited

U.S. PATENT DOCUMENTS

| | | |
|---|---|---|
| 2010/0287568 A1 | 11/2010 | Sundararaman |
| 2011/0093928 A1 | 4/2011 | Nakagawa et al. |
| 2011/0187493 A1 | 8/2011 | Elfstrom et al. |
| 2012/0036575 A1 | 2/2012 | Davis et al. |
| 2012/0114122 A1 | 5/2012 | Metivier |
| 2012/0157058 A1 | 6/2012 | Lowe |
| 2012/0221695 A1 | 8/2012 | Rose et al. |
| 2012/0278901 A1 | 11/2012 | Bunter |
| 2013/0093563 A1 | 4/2013 | Adolfsson et al. |
| 2013/0212661 A1 | 8/2013 | Neafsey et al. |
| 2014/0013418 A1 | 1/2014 | Davis et al. |
| 2014/0025408 A1 | 1/2014 | Ritter et al. |
| 2014/0123317 A1 | 5/2014 | Sughihara |
| 2015/0109098 A1 | 4/2015 | Singh |
| 2015/0128205 A1 | 5/2015 | Mahaffey et al. |
| 2015/0213247 A1 | 7/2015 | Davis et al. |
| 2015/0213248 A1 | 7/2015 | Davis et al. |
| 2015/0215322 A1 | 7/2015 | Davis et al. |
| 2015/0220711 A1 | 8/2015 | Lowe |
| 2015/0220721 A1 | 8/2015 | Davis et al. |
| 2015/0220722 A1 | 8/2015 | Davis et al. |
| 2015/0222613 A1 | 8/2015 | Lowe |
| 2015/0222622 A1 | 8/2015 | Lowe |
| 2015/0222623 A1 | 8/2015 | Lowe |
| 2015/0223066 A1 | 8/2015 | Lowe |
| 2015/0223067 A1 | 8/2015 | Lowe |
| 2015/0288464 A1 | 10/2015 | Tanner et al. |
| 2018/0101671 A1 | 4/2018 | Davis et al. |
| 2018/0203985 A1 | 7/2018 | Lowe |
| 2019/0087552 A1 | 3/2019 | Lowe |

FOREIGN PATENT DOCUMENTS

| | | |
|---|---|---|
| EP | 1333409 | 8/2003 |
| EP | 1562153 | 8/2005 |
| EP | 1628255 | 2/2006 |
| EP | 1841166 | 10/2007 |
| FR | 2839833 | 11/2003 |
| JP | 2002-129792 | 5/2002 |
| KR | 10-2004-032311 | 4/2004 |
| WO | WO 02/096070 | 11/2002 |
| WO | WO 03/081934 | 10/2003 |
| WO | WO 04/025545 | 3/2004 |
| WO | WO 2004/114190 | 12/2004 |
| WO | WO 05/024549 | 3/2005 |
| WO | WO 2005/038728 | 4/2005 |
| WO | WO 2005/091516 | 9/2005 |
| WO | WO 2005/096651 | 10/2005 |
| WO | WO 2007/126375 | 11/2007 |
| WO | WO 2007/130006 | 11/2007 |
| WO | WO 2007/139909 | 12/2007 |
| WO | WO 2008/024162 | 2/2008 |
| WO | WO 2008/024320 | 2/2008 |
| WO | WO 2008/035115 | 3/2008 |
| WO | WO 2008/042302 | 4/2008 |

OTHER PUBLICATIONS

Indala—"Product Families" www.indala.com/products/index.html (Copyright 2004) (2 pages).
NFC Forum—"About Near Field Communication" http://www.nfc-forum.org/aboutnfc/ (Copyright 2005) (3 pages).
Nokia—"Use Cases" http://www.nokia.com (Copyright 2005) (2 pages).
Phillips Semiconductoers—"Near Field Communication PN511—Transmision module." (Feb. 2004) (18 pages).
Official Action for Australia Patent Application No. 2007203452, dated May 19, 2011 2 pages.
Notice of Allowance for Australia Patent Application No. 2007203452, dated Mar. 21, 2012 3 pages.
Official Action for Canada Patent Application No. 2,596,561, dated Mar. 13, 2013 3 pages.
Notice of Allowance for Canada Patent Application No. 2,596,561, dated Jun. 30, 2014 1 page.
Extended Search Report for European Patent Application No. 07113279.9, dated Dec. 7, 2011 7 pages.
Official Action for U.S. Appl. No. 11/778,145, dated Nov. 18, 2010, 20 pages.
Official Action for U.S. Appl. No. 11/778,145, dated May 26, 2011, 20 pages.
Notice of Allowance for U.S. Appl. No. 11/778,145, dated Sep. 20, 2011 10 pages.
Official Action for U.S. Appl. No. 13/274,863, dated Aug. 6, 2012 26 pages.
Official Action for U.S. Appl. No. 13/274,863, dated Apr. 12, 2013 6 pages.
Notice of Allowance for U.S. Appl. No. 13/274,863, dated Jul. 25, 2013 7 pages.
Official Action for U.S. Appl. No. 14/017,065, dated Sep. 30, 2014 17 pages.
Official Action for U.S. Appl. No. 14/017,065, dated Apr. 17, 2015 21 pages.
Official Action for U.S. Appl. No. 15/143,993, dated Jul. 14, 2017 7 pages.
Notice of Allowance for U.S. Appl. No. 15/143,993, dated Nov. 22, 2017 5 pages.
U.S. Appl. No. 14/668,464, Davis et al., filed Mar. 25, 2015.
U.S. Appl. No. 14/668,494, Davis et al., filed Mar. 25, 2015.
U.S. Appl. No. 14/668,507, Davis et al., filed Mar. 25, 2015.
U.S. Appl. No. 14/668,517, Davis et al., filed Mar. 25, 2015.
U.S. Appl. No. 14/668,531, Davis et al., filed Mar. 25, 2015.
U.S. Appl. No. 14/674,085, Lowe, filed Mar. 31, 2015.
U.S. Appl. No. 14/674,094, Lowe, filed Mar. 31, 2015.
U.S. Appl. No. 14/674,109, Lowe, filed Mar. 31, 2015.
U.S. Appl. No. 14/674,125, Lowe, filed Mar. 31, 2015.
U.S. Appl. No. 14/674,167, Lowe, filed Mar. 31, 2015.
U.S. Appl. No. 14/674,175, Lowe, filed Mar. 31, 2015.
AU Office Action in Australian Application No. 2006343377, dated Jun. 3, 2010, 2 pages.
CA Office Action in Canadian Application No. 2,647,713, dated Nov. 20, 2012, 2 pages.
Declaration of Bruce Schneier in Support of Request for Inter Partes Review of the '374 Patent, dated Jun. 17, 2015, 134 pages.
Declaration of Bruce Schneier in Support of Request for Inter Partes Review of the '778 Patent, dated Jun. 17, 2015, 77 pages.
Examiner's Answer for U.S. Appl. No. 13/404,915, dated Feb. 7, 2014, 19 pages.
Joint Claim Construction Statement for Case No. SACV-14-00947-CJC (DFMx), Exhibit A of Petition for Inter Partes Review of U.S. Pat. No. 7,706,778, filed Jun. 18, 2015, 21 pages.
Mjølsnes et al., "On-Line E-Wallet System with Decentralized Credential Keepers," Mobile Networks and Applications, 2003, 8:87-99.
Nokia.com, "Use Cases" 2005, retrieved from URL <http://www.nokia.com>, 2 pages.
Notice of Allowance for Canadian Patent Application No. 2,647,713, dated Jul. 8, 2013, 1 page.
Notice of Allowance for U.S. Appl. No. 11/397,542, dated Feb. 18, 2010, 16 pages.
Notice of Allowance for U.S. Appl. No. 12/628,574, dated Nov. 15, 2011, 12 pages.
Official Action for U.S. Appl. No. 11/397,542, dated Mar. 31, 2009, 16 pages.
Official Action for U.S. Appl. No. 11/397,542, dated Oct. 28, 2008, 15 pages.
Official Action for U.S Appl. No. 11/397,542, dated Sep. 14, 2009, 12 pages.
Official Action for U.S. Appl. No. 12/628,574, dated May 26, 2011, 23 pages.
Official Action for U.S. Appl. No. 13/404,915, dated Dec. 3, 2012, 16 pages.
Official Action for U.S. Appl. No. 13/404,915, dated Jun. 4, 2012, 11 pages.
Official Action for U.S. Appl. No. 13/404,915, dated Jun. 14, 2013, 9 pages.

(56) References Cited

OTHER PUBLICATIONS

Official Action for U.S. Appl. No. 14/674,125, dated May 22, 2015, 9 pages.
Official Action for U.S. Appl. No. 14/674,167, dated Jun. 5, 2015, 11 pages.
*Spectrum Brands, Inc. and Unikey Technolgies, Inc.* v. *Assa Abboy AB*, "Final Written Decision," Case IPR2015-01562, U.S. Pat. No. 8,150,374, dated Jan. 12, 2017, 46 pages.
*Spectrum Brands, Inc.* v. *Assa Abloy AB*, Petition for Inter Partes Review of U.S. Pat No. 7,706,778, Case IPR2015-01563, U.S. Pat. No. 7,706,778, dated Jul. 8, 2015, 67 pages.
*Spectrum Brands, Inc.* v. *Assa Abloy AB*, "Petition for Inter Partes Review of U.S. Pat. No. 8,150,374," Case IPR2015-01562, U.S. Pat. No. 8,150,374, dated Jul. 8, 2015, 60 pages.
*Unikey Techinologies, Inc.* v. *Assa Abloy AB*, "Petition for Inter Partes Review of U.S. Pat. No. 8,150,374," Case IPR2015-01441, U.S. Pat. No. 8,150,374, dated Jun. 18, 2015, 64 pages.
*Unikey Technologies, Inc.* v. *Assa Abloy AB*, "Judgment Termination of Proceeding." Case IPR2015-01440, U.S. Pat. No. 7,706,778, dated Oct. 22, 2015, 4 pages.
*Unikey Technologies, Inc.* v. *Assa Abloy AB*, "Petition for Inter Partes Review of U.S. Pat. No. 7,706,778," Case IPR2015-01440, U.S. Pat. No. 7,706,778, dated Jun. 18, 2018 64 pages.
*Unikey Technologies, Inc.* v. *Assa Abloy AB*, "Decision—Institution of Inter Partes Review; Joinder," Case IPR2016-00686, U.S. Pat. No. 8,150,374, dated Sep. 6, 2016, 12 pages.
*Unikey Technologies, Inc.* v. *Assa Abloy AB*, "Judgment Termination of Proceedings," Case IPR2015-01441, U.S. Pat. No. 8,150,374, dated Oct. 22, 2015, 3 pages.
*Unikey Technologies, Inc.* v. *Assa Abloy AB*, "Petition for Inter Partes Review of U.S. Pat. No. 8,150,374," Case IRP2016-00686, U.S. Pat. No. 8,150,374, dated Feb. 26, 2016, 63 pages.

\* cited by examiner

METHOD AND APPARATUS FOR MAKING A DECISION ON A CARD

CROSS REFERENCE TO RELATED APPLICATIONS

The present application is a continuation of U.S. patent application Ser. No. 15/143,993, filed May 2, 2016, which claims the benefit of U.S. Provisional Patent Application Ser. No. 62/167,172, filed May 27, 2015, and is a continuation-in-part of U.S. patent application Ser. No. 14/017,065, filed Sep. 3, 2013, which is a continuation of U.S. patent application Ser. No. 13/274,863, filed Oct. 17, 2011, now U.S. Pat. No. 8,578,472, which is a continuation of U.S. patent application Ser. No. 11/778,145, filed Jul. 16, 2007, now U.S. Pat. No. 8,074,271, which claims the benefit of U.S. Provisional Application Ser. No. 60/821,897, filed Aug. 9, 2006, the entire disclosures of which are hereby incorporated herein by reference.

FIELD OF THE INVENTION

The present invention relates generally to access control systems, devices, and methods. More specifically, the present invention provides an access control system in which authentication decisions are made using a plurality of credentials.

BACKGROUND

In prior art access control systems, for example as shown in FIG. 1, typically credentials 120 (or other equivalent tokens) are used to authenticate a user to a system. These systems often employ cryptographic protocols, such as ISO 9798-2, to effect mutual authentication between the system and the card. Access is granted when the system recognizes the user, finds the privileges for the user in a database, and makes the decision based on the user's privileges outlined in the database. In all these prior art systems the credential 120 is primarily an information carrier; little use is made of processing power inherent in the credential 120.

In many prior art systems, the database is centralized. FIG. 1 depicts a centralized access control system 100 with a centralized database 104. The benefit of a centralized database in access control is the ease of data management, speed, and consistency with which data updates are shared in the access control system 100. However, such prior art systems suffer from high installation costs. If the access control decision is made centrally, then the locks and/or access points 108 are networked (either wired or wirelessly) to a central server or control panel 112. This is expensive. In the case of wired networks, there are costs associated with materials and labor because the wiring must be physically installed between all system components. In the case of wireless networks, there are increased costs associated with ensuring reliable and secure communication between all network nodes.

Another drawback of these prior art systems is their reliance on a physically or wirelessly connected network 116. Such reliance can cause service interruptions when the network is not available. Prior art systems typically do not store policy information (i.e., information used to grant or deny access to a credential 120) at access points such as a door. Instead the system operates in reduced-mode when communication is lost. Storing policy information at the door is possible in prior art systems, but at a higher cost due to both equipment and maintenance.

Other prior art systems, such as those found in WO04025545 and U.S. Pat. No. 6,719,200 make authentication checks based on biometric information using a networked connection and a credential 120 or other processor device. In these types of prior art systems, a biometric template is stored on the credential 120 and a second biometric template is created from a biometric scan taken in response to an access request. The second biometric template is stored in a database 104 on the network 116 and sent to the credential 120 upon presentation of the credential 120 to an access reader. These systems use biometrics for authentication that can later lead to a control decision after user rights are checked, but the credential's processor does not make the access control decision. Rather, the credential's processor verifies that the biometric data received from the network database matches biometric data stored on the credential 120 before any further communications are initiated by the credential with a reader for purposes of gaining access. In these systems the reader still makes the ultimate access control decision.

In other prior art systems, policy information from the database 104 is distributed among non-networked locks. In these prior-art systems, the management of the policy information is problematic. Updating the databases may be accomplished by special reprogramming visits by security personnel, but this is expensive in time, especially in a large system having numerous non-networked locks. Alternatively, the lock database is updated via a pseudo-network created on the user cards, such as the one discussed in WO05024549A2. In these systems, datagram networking techniques pass database records from central system to non-networked locks by additional messaging between user card and lock, see for example U.S. Pat. No. 6,766,450. Typically, systems based on this model involve passing a large amount of data between the user card and the lock, which slows the access control process and makes the experience unpleasant for the user, and consumes energy. This can be a serious detriment in the case of battery-powered locks where power consumption is at a premium.

In yet other prior art systems, such as those described in U.S. Pat. No. 6,374,356, the database of policy information for each user is carried on the card itself. For example, if a user is privileged to open a certain subset of doors in the system, then the card holds information to that effect. In these prior art systems, the lock reads the database record from the card, then the lock determines if the user privileges include opening the lock. In large systems, the access control database record may contain a relatively large amount of data that must be passed to the lock. This transfer of data again slows the access control process and consumes energy.

Database management and transmitted policy information described in the prior art are both processes that can consume significant amounts of time and energy. Energy use is an important consideration for applications where the local door device is battery operated.

SUMMARY

In one embodiment, the problem associated with updating disconnected readers is addressed by obviating the need for policy information to be transferred from the credential to the reader. In accordance with at least one embodiment of this invention, the credential holds policy information and the local host transfers information needed to make an access decision to the credential. The credential uses its processor to make the enforcement decision and transfers the decision or results of that decision to the local host.

While embodiments of the invention do not preclude the capability of transmitting identity information from the credential to the reader, some embodiments may provide the additional capability of securely enforcing control policy without disclosing the credential identity. Moreover, embodiments of the present invention can be used with a networked control system or in a distributed control system. Additionally, certain embodiments of the invention offer a cost saving means by making it possible to create an access control system that is expandable with non-networked readers.

It is one objective of the present invention to provide a secure access control system capable of working with non-networked hosts (local hosts), in which a reader of the local host contains no database, and in which a minimal amount of communication is required between the local host and the credential.

Aspects of the invention address technical problems inherent in prior art systems by having the policy information or user privilege data on the credential and the access control decision made using the credential's microprocessor and communicated to an access control device associated with the local host.

In one embodiment, a local host need only authenticate with the credential using an appropriate protocol, which are well known in the prior art, and transmit to the credential an ID and/or functional identification. After mutual authentication, time and date information are passed from the local host to the credential. This represents a relatively small amount of data and is virtually independent of system size. It should be noted that scalability of the system may depend on additional required messaging, such as a Certificate Revocation List (CRL). As can be appreciated by one of skill in the art, CRLs present just one way to invalidate a user. A CRL can be used if the credential information is digitally signed. More generally, however, a list of revoked credentials may be employed.

According to one embodiment of the present invention, each credential carries unique privilege information for the credential user, which may include a list of local host or door ID numbers, timestamps, access schedule information, security class information, and additional rules or controls relevant to the user's access authorizations. This information might be coded as a list of door ID numbers, or as a set of rules, or in other ways which are well known to those skilled in the art.

In one embodiment, the processor on the credential runs an algorithm, contained on the credential, to determine if the credential holder privileges allow the credential user to open the door or access the asset protected by the local host. If the decision is made that the credential user is granted access, then a secure message is sent to the door or local host requesting the access control device (e.g., a lock) to open.

If the processor on the credential determines that the credential user is not allowed access to the asset, then no further action is required. Alternatively, if a no-access decision by the credential is made, the credential may send a code to the reader, which allows both the reader and credential to record an unauthorized attempt to gain access. The record may be stored at the reader, the credential, or both. This type of information related to an unauthorized access attempt might be useful for later investigation or security analysis.

It is assumed that privileges and algorithms residing on the credential can be periodically and securely maintained by appropriate means, such as connection to or communication with a central database by a credential reader/writer.

The reader/writer may be associated with a PC, workstation, or at a networked access-control point. This is preferable of prior art schemes where a database is updated periodically on the reader, because the reader is typically stationary and may be remote, whereas the credential is mobile and typically carried by the user wherever he might require to use it. The credential can therefore be brought to the reader/writer rather than bringing the reader/writer to all local hosts.

Expiration of the privileges on the credential (e.g., to prevent unauthorized use of a lost or misplaced credential) may be enforced by time-stamping the privileges on the credential, or by other known mechanisms. In any case, the processor on the credential may still make the access control decision by running an algorithm.

In one embodiment, the access control system comprises one or more non-networked door locks otherwise known as local hosts, one or more credentials, one or more credential reader/writers, and a central access control system including a master database and system administrator interface.

The local host, in one embodiment, comprises an access control device and a controller. The controller preferably utilizes a microprocessor, a random number generator or alternatively a secure seed and a pseudo-random number generator, a cryptographic coprocessor, and control circuitry to operate the blocking mechanism (e.g., a lock, password protection program, or the like). The local host may further include a power source such as a battery or a solar cell, volatile and nonvolatile memory, a real-time clock, and a Radio Frequency Identification (RFID) reader or other communication mechanism.

The credential, in one embodiment, comprises a communication mechanism, for example, either an RFID antenna or electrical contacts typical to a contact credential 216, and a smartcard controller. The credential 216 controller generally comprises a microprocessor, RFID or other communications circuitry, a random number generator, a cryptographic coprocessor, and volatile and non-volatile memory. Preferably the memory and circuitry of the credential and the local host are designed utilizing security features to prevent unauthorized access to the memory contents, side channel analysis, and the like.

In a transaction, the reader of the local host supplies its ID and current date and time information to the credential. The credential contains access privilege data, normally specific to the credential holder. Based on the ID and time, coupled with the privileges data, the credential decides if the credential holder may access the asset protected by the local host.

In one embodiment, if access is granted, then the credential issues a secure "unlock request" to the local host. If access is not granted, then no action need be performed. As can be appreciated, a system based on embodiments of this invention can be made secure against playback and other simple attacks by employing suitable cryptographic techniques in authentication and messaging.

The Summary is neither intended or should it be construed as being representative of the full extent and scope of the present invention. The present invention is set forth in various levels of detail and the Summary as well as in the attached drawings and in the detailed description of the invention and no limitation as to the scope of the present invention is intended by either the inclusion or non inclusion of elements, components, etc. in the Summary. Additional aspects of the present invention will become more readily apparent from the detailed description, particularly when taken together with the drawings.

DETAILED DESCRIPTION

Embodiments of the present invention are directed toward devices and methods of using such devices in a secure access system. Although well suited for use in systems and methods employing RF communication protocols, embodiments of the present invention may be suitable for use in systems employing other communication protocols including, but not limited to, optical communication protocols, magnetic communication protocols, and the like.

Figure 1:
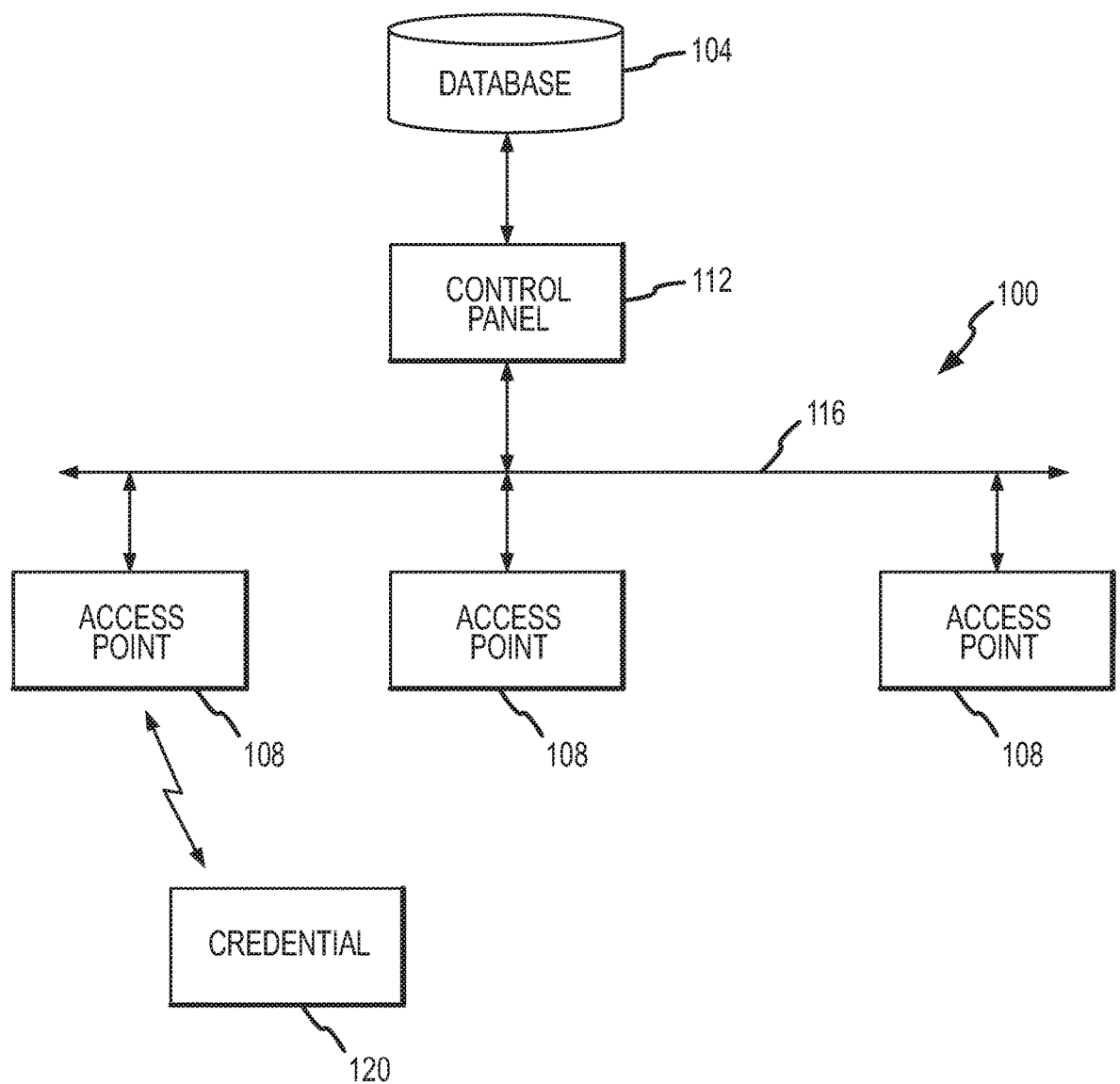
FIG. 1 depicts a centralized access control system in accordance with embodiments of the prior art.
Figure 2:
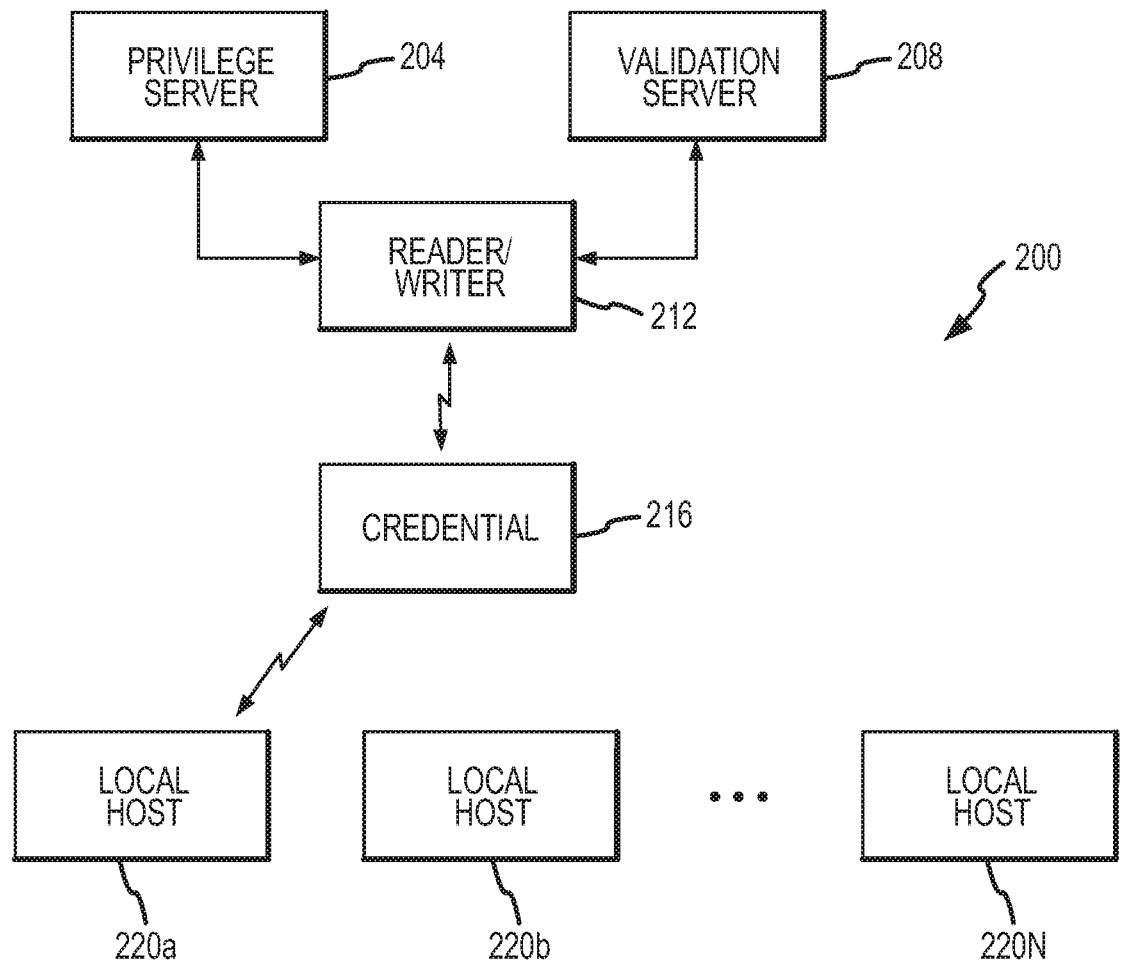
FIG. 2 depicts an access control system in accordance with embodiments of the present invention.

FIG. 2 depicts a secure access system 200 in accordance with at least some embodiments of the present invention. The secure access system 200 generally includes a privilege server 204 and a validation server 208 that communicate with one or more credentials 216 through a reader/writer 212. The privilege server 204 and validation server 208 are dedicated servers that provide certain services to credentials 216 in the system 200. Although depicted separately, a single server or similar device may execute the functionality of both the privilege server 204 and the validation server 208. The privilege server 204 and/or validation server 208 are capable of communicating with the reader/writer 212 via any known communication protocol such as Internet Protocol (IP) standard or the like.

The privilege server 204 initializes, modifies, and changes applications and application data stored on a credential 216 by using the writing feature of the reader/writer 212. The privilege server 204 can increase or decrease the scope of the privileges associated with the credential. The privilege server 204 has access to a user database that identifies what access permissions various users in the system 200 have. When a credential 216 is presented to the reader/writer 212, the privilege server 204 accesses data on the credential 216 using a symmetric key, Kp, that is shared between the privilege server 204 and the credential 216. Of course, the key, Kp, may also be an asymmetric key or other type of secret. Then the privilege server 204 can identify who the holder of the credential 216 is or is supposed to be. Once the privilege server 204 knows the identity of the holder it can generate the appropriate access permissions and write those permissions to the credential 216 in the form of application data. Additionally, the privilege server 204 can write an application to the credential 216 that is used by the credential 216 to make access decisions based, in part, on the application data. The privilege server 204 stores application data that includes, but is not limited to, schedule data (i.e., access permissions data by time), local host data (i.e., access permissions by local host), timestamp data, and authentication keys for each credential 216 in the population of credentials 216 in the access control system 200. The application data for each credential 216 may be stored in a portion of memory in the privilege server 204 or in a separate database. The privilege server 204 also has access to the current time either by an Internet connection, an internal clock, or by some other mechanism.

The validation server 208 is provided to refresh the application on a credential 216 with a privilege expiration, typically in the form of a timestamp. The validation server 208 does not increase the scope of the privileges associated with a credential, other than by extending the time existing credentials are valid. The validation server 208 has access to the current time. The validation server 208 also has access to the current validation status of all access control privileges for every credential holder. Validation status information may be stored either in memory of the validation server 208 or in an external database. When a credential 216 is presented to the reader/writer 212, the validation server 208 determines if the credential's status is still active and also determines if the schedule data on the credential 216 is current. If both are true, then the validation server 208 sets a new expiration for the application data on the credential 216. Of course, the validation server 208 does not have to set a new expiration if current data is not expired. Otherwise, the application data is left alone such that it either remains expired or will expire after a predetermined expiration period, or may renew it, even if expired if such instructions are in the system.

The reader/writer 212 acts as a communication conduit between the credential 216, privilege server 204, and validation server 208. As can be appreciated, a separate and dedicated reader/writer 212 may be provided for both the privilege server 204 and the validation server 208. Additionally, the reader/writer 212 may also be a networked reader/writer 212 associated with an access point in the access control system 200. A networked reader/writer 212 may read and perform authentication with the credential 216 and then act as a communication conduit between the credential 216 and the validation server 208. The system may also be a single server with both the privilege and validation functionality working through a single reader/writer. There may also be multiple reader/writers connected in a network at different locations to permit credentials to be updated or validated at physically different locations but under the control of a single administrative system.

The credential 216 may be any suitable type of access control device. In one embodiment, the credential 216 is capable of making real-time or near real-time access decisions. In other words, the credential 216 is capable of determining whether it is granted or denied access to various assets in the secure access system 200. The credential 216 stores application data that includes access permissions and algorithms for making access decisions. The credential 216 may be provided with a unique ID that distinguishes it over other credentials 216 in the population of credentials 216. In one embodiment, the credential ID, application data, and other data stored on the credential 216 is protected using various symmetric keys. The credential 216 generally includes an RF transponder that enables the credential 216 to communicate using contactless communication protocols. Examples of a suitable credential 216 include, but are not limited to, a contactless smartcard, a passport, a key fob, a cellular phone (including a smart phone), a PDA, portable computer (including tablet computers and wearable computers), or any other device having appropriate functionality. Alternatively, the credential 216 may be in some other machine-readable form. For example, the credential 216 may employ magnetic, optical, or contact communication methods.

Using any type of communication protocol, the credential 216 is capable of communicating with a local host 220a-N. A local host 220 is any type of non-networked access point. The local host 220 controls access to one or more assets such as a building, room, computer, database, file, and so on. The local host 220 is typically assigned a unique ID that identifies the host or the asset protected by the host. In one embodiment, the host ID is passed to the credential 216 in order for the credential 216 to have enough information to make an access decision. In a preferred embodiment, the local host 220 only needs to supply its host ID and the current time to the credential 216.

Figure 3:
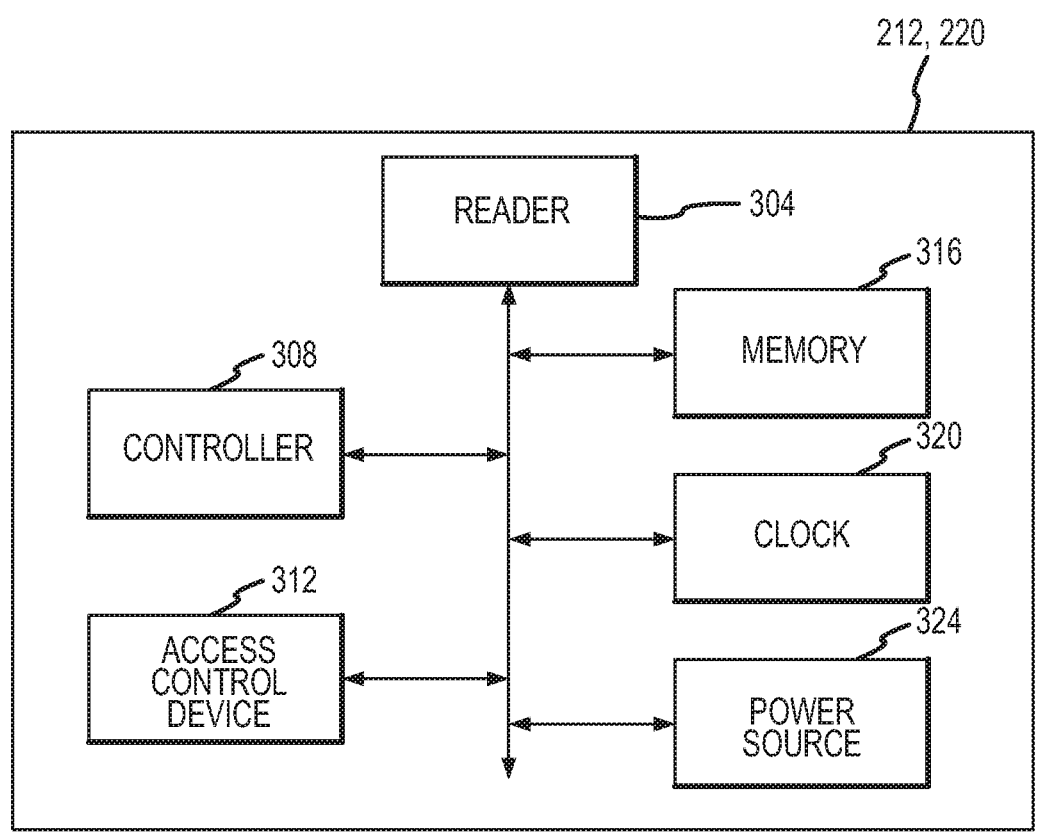
FIG. 3 depicts components of a local host in accordance with embodiments of the present invention.

Referring now to FIG. 3, an exemplary reader/writer 212 or local host 220 will be described in accordance with at least some embodiments of the present invention. The reader/writer 212 or local host 220 generally comprises a reader 304 capable of automatically reading data from a credential 216. The reader 304 may also be capable of writing data back to the credential 216. The reader 304, in one embodiment, comprises an RF antenna used to communicate back and forth with the credential 216.

Connected to the reader 304 is a controller 308. In one embodiment, the controller 308 includes a microprocessor, a random number generator, and a cryptographic coprocessor. The controller 308 is capable of properly modulating/demodulating data sent to and received from external devices such as the credential 216. The controller 308 controls and determines how the reader/writer 212 or local host 220 behaves when a credential 216 is presented to it. The controller 308 may include any general-purpose programmable processor, digital signal processor (DSP) or controller for executing application programming. Alternatively, the controller 308 may comprise a specially configured application specific integrated circuit (ASIC).

The controller 308 may also be provided with control circuitry capable of manipulating an access control device 312. The access control device 312 is designed to secure the asset being protected by the reader/writer 212 or local host 220. Examples of a typical access control device 312 include, without limitation, an electronic lock, a magnetic lock, or an electric strike for a door, a lock for a computer system, a lock for a database, a lock on a financial account, or a lock on a computer application. In one embodiment, the controller 308 actuates the access control device 312 based on results of an access decision provided to the controller 308 from the credential 216. The access control device 312 may be integral to the reader/writer 212 or local host 220 in one embodiment. In an alternative embodiment, access control device 312 is external to the reader/writer 212 or local host 220.

In addition to an access control device 312, the reader/writer 212 or local host 220 may further comprise a memory 316. The memory 316 may be used to store application data, the host unique ID, and any other functions that can be executed by the controller 308. The memory 316 may comprise volatile and/or non-volatile memory. Examples of non-volatile memory include Read Only Memory (ROM), Erasable Programmable ROM (EPROM), Electronically Erasable PROM (EEPROM), Flash memory, and the like. Examples of volatile memory include Random Access Memory (RAM), Dynamic RAM (DRAM), Static RAM (SRAM), or buffer memory. In one embodiment, the memory 316 and the controller 308 is designed to utilize known security features to prevent unauthorized access to the contents of the memory 316 such as side channel analysis and the like.

The reader/writer 212 or local host 220 may further comprise a clock 320. The clock 320 is depicted as internal to the reader/writer 212 or local host 220, but the clock may also be external to the reader/writer 212 or local host 220. The clock 320 tracks the current time. The controller 308 can read the time from the clock 320 and provide that time to a credential 216. The credential 216 uses the time from the clock 320 to determine if the holder of the credential 216 is currently allowed access to an asset protected by the access control device 312.

A power source 324 may also be included in the reader/writer 212 or local host 220 to provide power to the various devices contained within the reader/writer 212 or local host 220. The power source 324 may comprise internal batteries and/or an AC-DC converter such as a switch mode power supply or voltage regulator connected to an external AC power source.

Although not depicted, a reader/writer 212 may further include a communication interface that provides communication capabilities between the reader/writer 212 and external servers or other network nodes. Such a communication interface may include a USB port, a modem, a network adapter such as an Ethernet card, or any other communication adapter known in the art.

Figure 4:
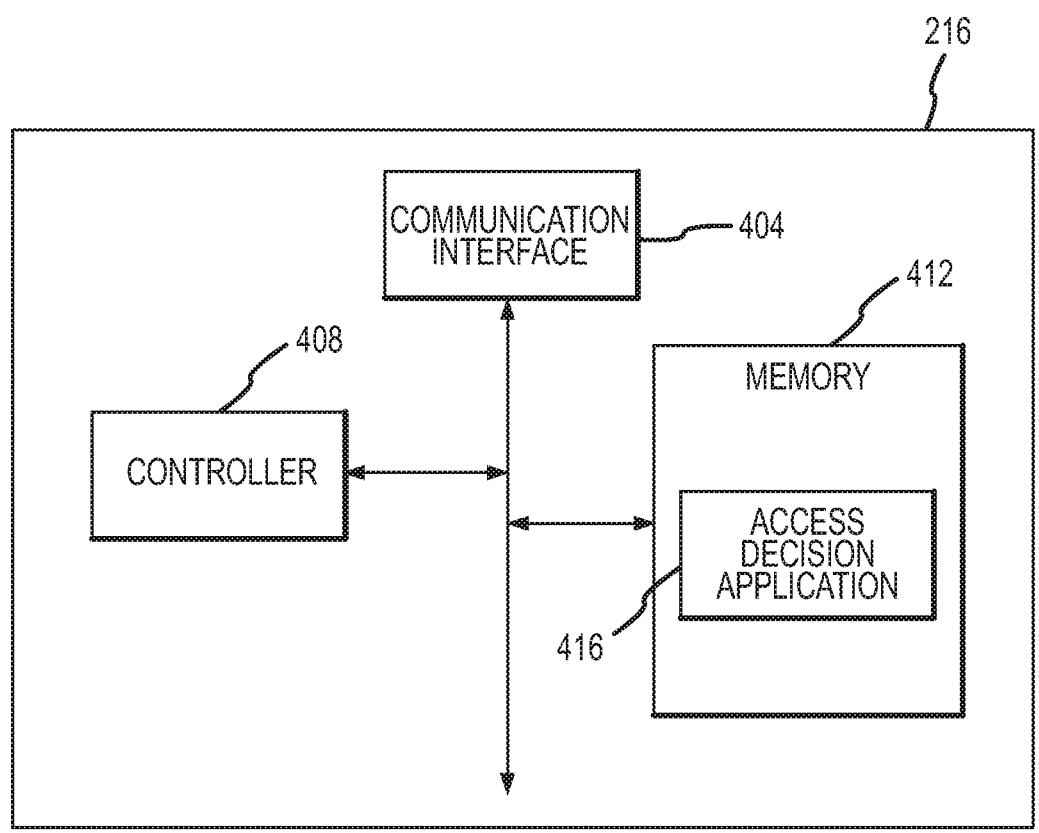
FIG. 4 depicts components of a credential in accordance with embodiments of the present invention.

Referring now to FIG. 4, an exemplary credential 216 will be described in accordance with at least some embodiments of the present invention. The credential 216 may include a communication interface 404 that allows the credential 216 to communicate with external devices such as the reader/writer 212 or local host 220. The communication interface 404 may comprise an RF antenna that allows the credential 216 to receive and transmit data without contact. In other embodiments a magnetic, optical, or electrical contact communication interface 404 may be utilized.

A controller 408 may be connected to the communication interface 404. The controller 404, in one embodiment, includes a microprocessor, a random number generator, and a cryptographic coprocessor. The controller 408 may include any general-purpose programmable processor, digital signal processor (DSP) or controller for executing application programming. Alternatively, the controller 408 may comprise a specially configured application specific integrated circuit (ASIC). Similar to the controller 308 on the reader/writer 212 or local host 220, the controller 408 includes known security features that substantially prevent unauthorized access to the contents of memory 412.

The memory 412 typically comprises non-volatile memory, such as flash memory. Non-volatile memory is generally used because the credential 216 is preferably a passive credential meaning that it does not have an internal source of power. Rather, the credential 216 uses energy from an RF field created by the reader/writer 212 or local host 220 to power its components. Contents of the memory 412 may include an access decision application 416. As noted above, the privilege server 204 may write the access decision application 416 along with application data to the credential 216. In a preferred embodiment, the access decision application 416 and application data are written to the credential 216 in a secure environment. The access decision application 416 contains an algorithm or algorithms that can be used to make an access decision. The controller 408 can access the access decision application 416 and application data to make an access decision with respect to a particular reader/writer 212 or local host 220.

In an alternative embodiment the credential 216 may be provided with an onboard power supply. Such credentials 216 are known as active credentials 216. An active credential 216 can keep its own trusted time that can be synchronized with the network devices during interactions with the privilege server 204 and/or validation server 208.

Figure 5:
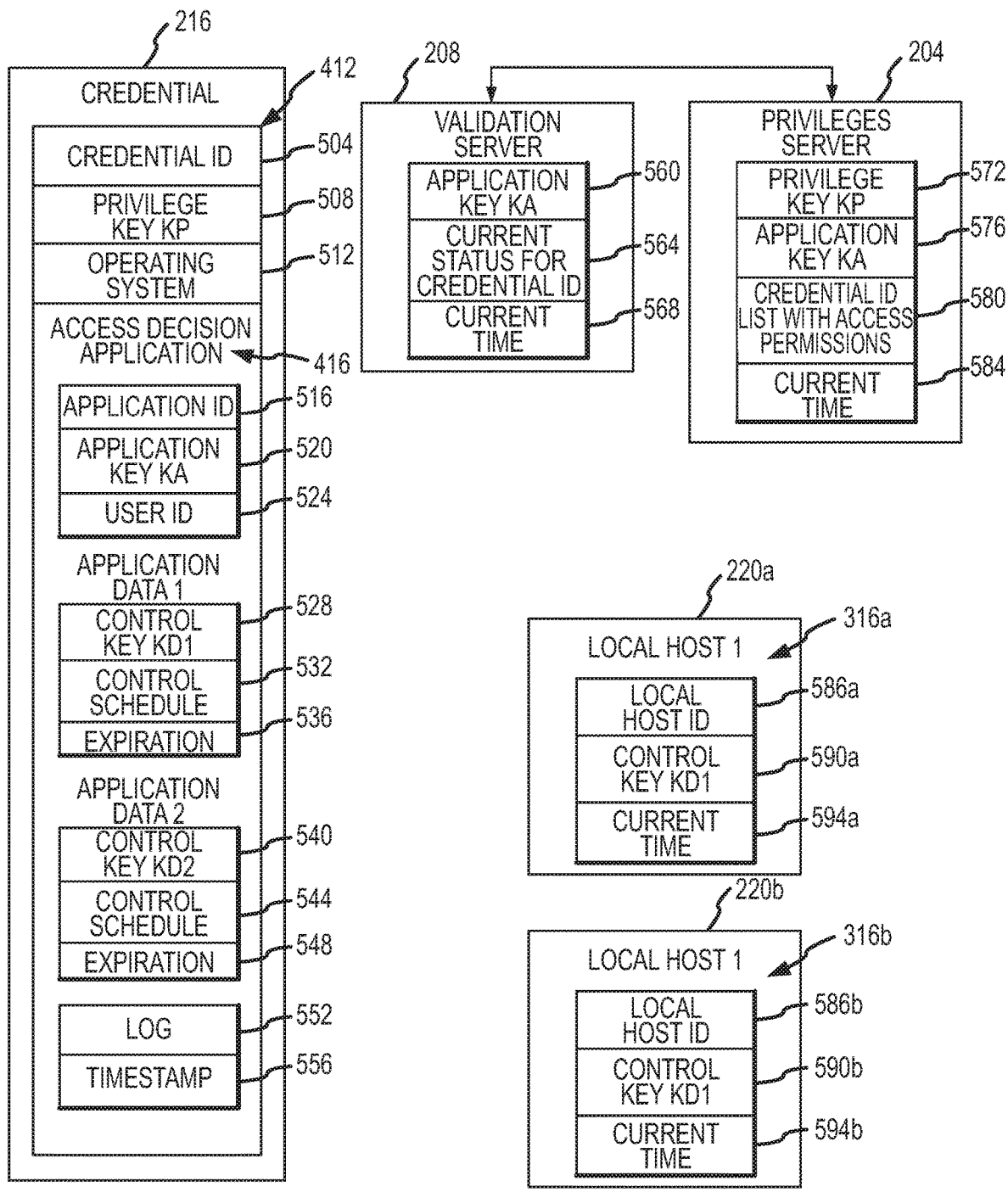
FIG. 5 depicts logical data components of the access control system in accordance with embodiments of the present invention.

FIG. 5 depicts logical components of each device in the secure access system 200 in accordance with at least some embodiments of the present invention. The memory 412 of the credential 216 generally contains application data and an access decision application 416. The memory 412 may also include credential specific data such as a credential ID 504 and a privilege key Kp 508. The memory 412 may also include an operating system 512 that defines the normal functionality of the credential 216.

The access decision application 416 is a second program or algorithm that may be stored on the memory 412. The access decision application 416 may be given a unique Application ID 516 that distinguishes this application from other applications, such as the operating system 512, that are stored in memory 412. A symmetric application key Ka 520 is also stored in memory 412. The application key Ka protects access to the application data. The application key Ka may be shared upon initialization of the system or creation of the application with the validation server 208. The application key Ka 520 is typically different from the privilege key Kp used by the privilege server 204 to access and rewrite the entire access decision application 416. The application key Ka 520 is required to update or modify the expiration of the access decision application 416. Also stored in the memory 412 in association with the access decision application 416 is a user ID 524. The user ID 524 identifies the intended user of the credential 216. The user ID 524 may be an arbitrary identifier such as a randomly assigned number or may be the user's social security number, employee number, or the like. The user of the credential 216 is assigned the user ID 524 for use with the access decision application 416. The user ID 524 is employed by the privilege server 204 to assign user access permissions and by the validation server 208 to update access permissions. The user ID 524 is generally not needed for use with a local host 220.

As previously noted, application data may be stored as a part of the access decision application 416. A set of application data is substantially unique to a particular application and therefore is substantially unique to certain local hosts 220. For example, a first set of application data may be used to make access decisions for rooms in a building. A second set of application data may be used to make access decisions for a garage door or the like whereas a third set of application data may be used to make access decisions related to electronic files or programs.

In one embodiment, a first set of application data includes a control key KD1 528, a control or access schedule 532, and an expiration time 536. The control key KD1 528 is shared with the local host(s) 220 that will be used in association with the first application. The control key KD1 528 is used by the local host 220 and credential 216 to authenticate with one another. The control schedule 532 is a logical combination of the credential's 216 access permissions by time as well as the credential's 216 access permission by local host 220. The access decision application 416 uses the control schedule 532 to determine if access should be granted or denied for the holder of the credential 216 with respect to a particular reader/writer 212 or local host 220. The expiration 536 controls the useful life of the application data and is generally only updated by the validation server 208. If the expiration 536 has lapsed or expired then the control schedule 532 is rendered invalid until it is presented to a validation server 208 and the expiration 536 is updated again. The credential 216 will be incapable of making an access decision for any local host in the first application if the expiration 536 for that application has caused the control schedule 532 to be rendered invalid.

More than one set of application data may be stored in the access decision application 416. A second set of application data may include a control key KD2 540, a control schedule 544, and an expiration 548. The second set of application data is substantially unique to the second application and thus preferably runs the second application independent of the first application. For example, the lapse of the first expiration 536 does not necessarily mean that the second expiration 548 has lapsed.

Although two application data blocks are depicted in FIG. 5, one skilled in the art will appreciate that a lesser or greater number of application data blocks may reside on the credential 216. In one embodiment, there may be a different application data block for each local host 220 in the secure access system 200.

In addition to application data, the access decision application 416 may also store access history in a log file 552. The log file 552 contains data related to access decisions made by the credential 216. Both access granted decisions and access denial decisions along with the corresponding time of decision and reader/writer 212 or local host 220 are stored in the log file 552. The log file 552 can be accessed to determine the whereabouts and actions of the holder of the credential 216.

A timestamp 556 may also be stored as a part of the access decision application 416. The timestamp 556 represents the most recent time that the credential 216 was accessed by a reader/writer 212 or local host 220. Comparison of the timestamp 556 and expiration 536, 548 may determine whether a particular application should be rendered invalid by deactivating the control schedule 532, 544.

The privilege server 204 generally stores data for managing the privileges of the population of credentials 216. The type of data available to the privilege server 204 for each credential 216 in the population of credentials 216 may include a privilege key Kp 572, an application key Ka 576, a credential ID list with access permissions data 580, and the current time 584. The data for all credentials 216 may be stored in a separate database that can be accessed by the privilege server 204. The privilege server 204 identifies a particular credential 216 and pulls relevant data for that credential 216 into the fields described above using the privilege key Kp 572. The privilege server 204 employs the application key Ka 576 to authenticate with the credential 216. Once the privilege server 204 is authenticated using the application key Ka 576, the privilege server 204 can modify the access decision application 416 and any application data associated therewith.

The use of the keys Kp 572 and Ka 576 may involve the transmission of an encrypted random or pseudorandom message. The privilege server 204 typically has a random number generator and in the event that the credential 216 does not have a random number generator, the privilege server 204 can provide the random message for the credential 216 to use in authentication.

As noted above, once the privilege server 204 has identified the credential 216 and has pulled the relevant access permissions data 580, the privilege server 204 can write or modify the access decision application 416 along with the current time 584. The current time 584 may be stored by the credential 216 as the timestamp 556.

The validation server 208 generally stores data for managing the expiration of application data on credentials 216. The type of data available to the validation server 208 for each credential 216 in the population of credentials 216 may include an application key Ka 560, a credential status 564, and the current time 568. The validation server 208 employs the credential status 564 data to determine if the credential's 216 expirations 536, 548 should be updated or removed. The current time from the validation server 208 may also be written to the timestamp 556 data field in the access decision application 416.

Each local host 220*a*-N may store unique data to the host or the application employed by the host in their respective memories 316*a*-N. The type of data stored in a local host 220 may include a local host ID 586, a control key KD1 590, and the current time 594. The control key KD1 590 is used to authenticate with a credential 216 and more specifically to authenticate with a particular set of application data stored in the application decision application 416. Once authenticated, the local host ID 586 and current time 594 are provided to the credential 216 such that an access decision can be made by the credential 216.

Figure 6:
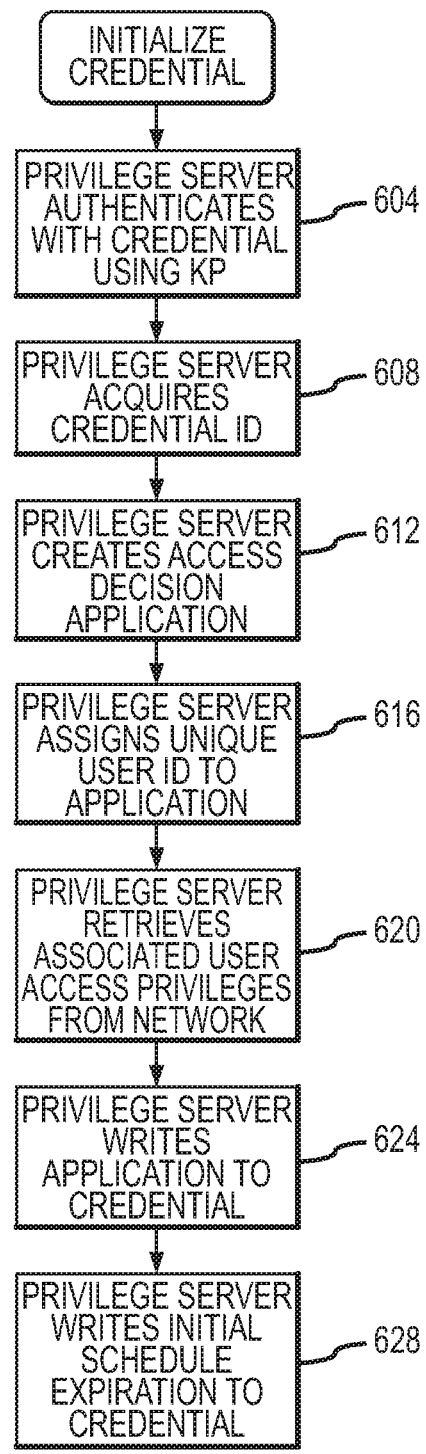
FIG. 6 depicts a method of initializing a credential with access data in accordance with embodiments of the present invention.

Referring now to FIG. 6, a method of initializing a credential 216 will be described in accordance with at least some embodiments of the present invention. Initially, the method begins with the privilege server 204 authenticating with the credential 216 (step 604). The privilege server 204 uses its privilege key Kp 572 and the credential 216 uses its privilege key Kp 508 to authenticate with one another. As noted above, the authentication step may involve the transmission of an encrypted random message between the credential 216 and privilege server 204.

Once the privilege server 204 and credential 216 are properly authenticated, the privilege server 204 acquires the credential ID 504 from the credential 216 (step 608). The privilege server 204 references a credential database with the credential ID 504 to eventually pull the access permissions for the particular credential 216 (or holder of the credential 216) presented to the privilege server 204. The privilege server 204 then creates the access decision application 416 (step 612). The access decision application 416 includes at least one set of application data. More sets of application data may be included in the access decision application 416 if more than one application is to be run by the same credential 216.

After the access decision application 416 has been created, the privilege server 204 assigns a unique user ID 524 to the application (step 616). Other devices in the network 200 will ultimately use the unique user ID 524 to determine if the application 416 is still valid. The privilege server 204 then retrieves the associated user access permissions data 580 from the network using the credential ID 504 (step 620). The user access permissions data 580 define what reader/writers 212 or local hosts 220 the user is allowed to access and the times the user is allowed to access them. This user access permissions data 580 along with the user ID 524 is written to the credential 216 as a part of the access decision application 416 (step 624).

Upon writing the application to the card, or soon thereafter, the privilege server 204 also writes expirations 536, 548 for each set of application data included in the access decision application (step 628). The expirations 536, 548 can be a timing based instruction to either delete a particular set of application data or render the corresponding control schedule 532 invalid and thus unusable. After a set of application data has expired, the credential 216 will need to be presented to a reader/writer 212 such that either a privilege server 204 or validation server 208 can update the expirations 536, 548. Alternatively, the expirations 536, 548 may be valid and can remain unchanged. It should be noted that separate access decision applications for separate application data may be sequentially or simultaneously created.

Figure 7:
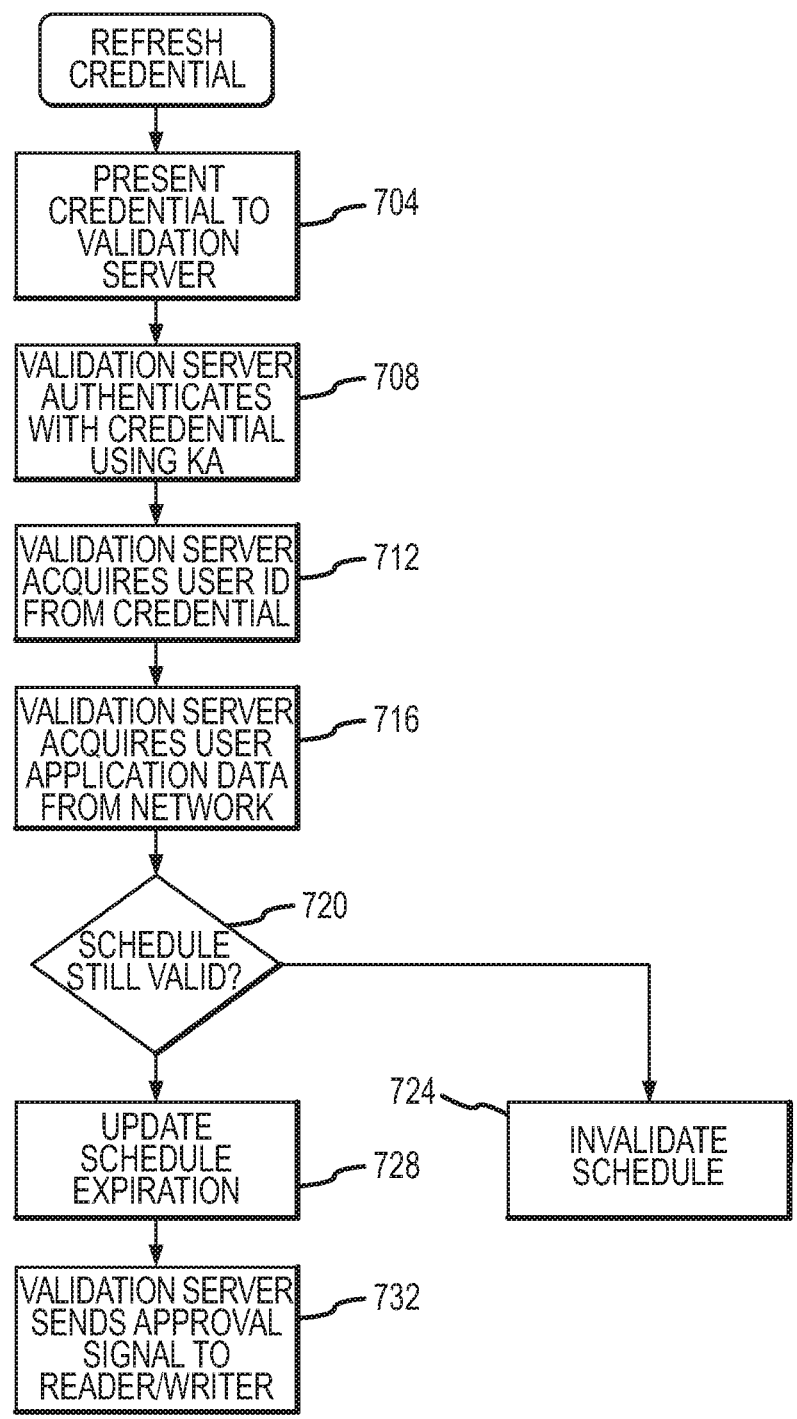
FIG. 7 depicts a method of refreshing access information on a credential in accordance with embodiments of the present invention.

Referring now to FIG. 7, a method of refreshing an access decision application 416 will be described in accordance with at least some embodiments of the present invention. Initially, a credential 216 is presented to the validation server 208 (step 704). The presentation of the credential 216 to the validation server 208 may be through a communication conduit provided by a reader/writer 212. Upon presentation of the credential 216 to the validation server 208, authentication between the credential 216 and the validation server 208 occurs (step 708). The credential 216 uses application key Ka 520 to authenticate with the validation server 208 and the validation server 208 uses application key Ka 560 to authenticate with the credential 216. The application keys Ka 520, 560 are shared symmetric keys unique to the access decision application 416. The authentication step helps ensure that both devices know they are communicating with a valid device.

After mutual authentication, the validation server 208 acquires the user ID 524 from the credential 216 (step 712). Using the user ID 524, the validation server 208 acquires the application data for the presented credential 216 or holder of the credential 216 (step 716). The application data for the presented credential 216 can be obtained from periodic updates of the user's application data from the privilege server 204 or by accessing the privilege server 204 in real-time. The validation server 208 then analyzes the application data for the presented credential 216 to determine if the access permissions for that credential 216 are still valid (step 720). In the event that the access permissions are no longer valid, then the validation server 208 invalidates the control schedule(s) 532, 544 that were identified as inactive (step 724). Access permissions may become invalid for a number of reasons. For example, the holder of the credential 216 may have been terminated or had his/her permissions changed and therefore the application data stored on the credential 216 is out no longer valid. Alternatively, the access permissions may require updating and the application data has not been updated within the predetermined time.

The control schedule 532, 544 can be invalidated by executing the expiration function 536, 548 corresponding to the inactive control schedule 532, 544. Alternatively, access to the control schedule 532, 544 can be restricted thus inhibiting the credential 216 from making an access decision. In one embodiment, a control schedule 532, 544 is marked invalid by setting the timestamp to all zeros. In another embodiment control schedules 532, 544 are marked invalid by setting the expiration to a time in the past or to a different prescribed invalid code.

In the event that the access permissions are still valid, the method continues and the validation server 208 updates the schedule expiration 536, 548 if appropriate or necessary (step 728). The expiration 536, 548 may be updated both in the network as well as the credential 216. The reader/writer 212 may be used to write the updated expiration 536, 548 to the credential 216. Updating the expiration 536, 548 may include adding additional time to the expiration counter or changing the expiration date.

Once the expiration 536, 548 has been updated, the validation server 208 sends an approval signal back to the reader/writer 212 (step 732). The reader/writer 212 may then grant the holder of the credential 216 access to the asset protected by the reader/writer 212. Alternatively, a light or similar type of indicator may be activated showing the credential 216 holder that the expiration 536, 548 has been successfully updated.

Figure 8:
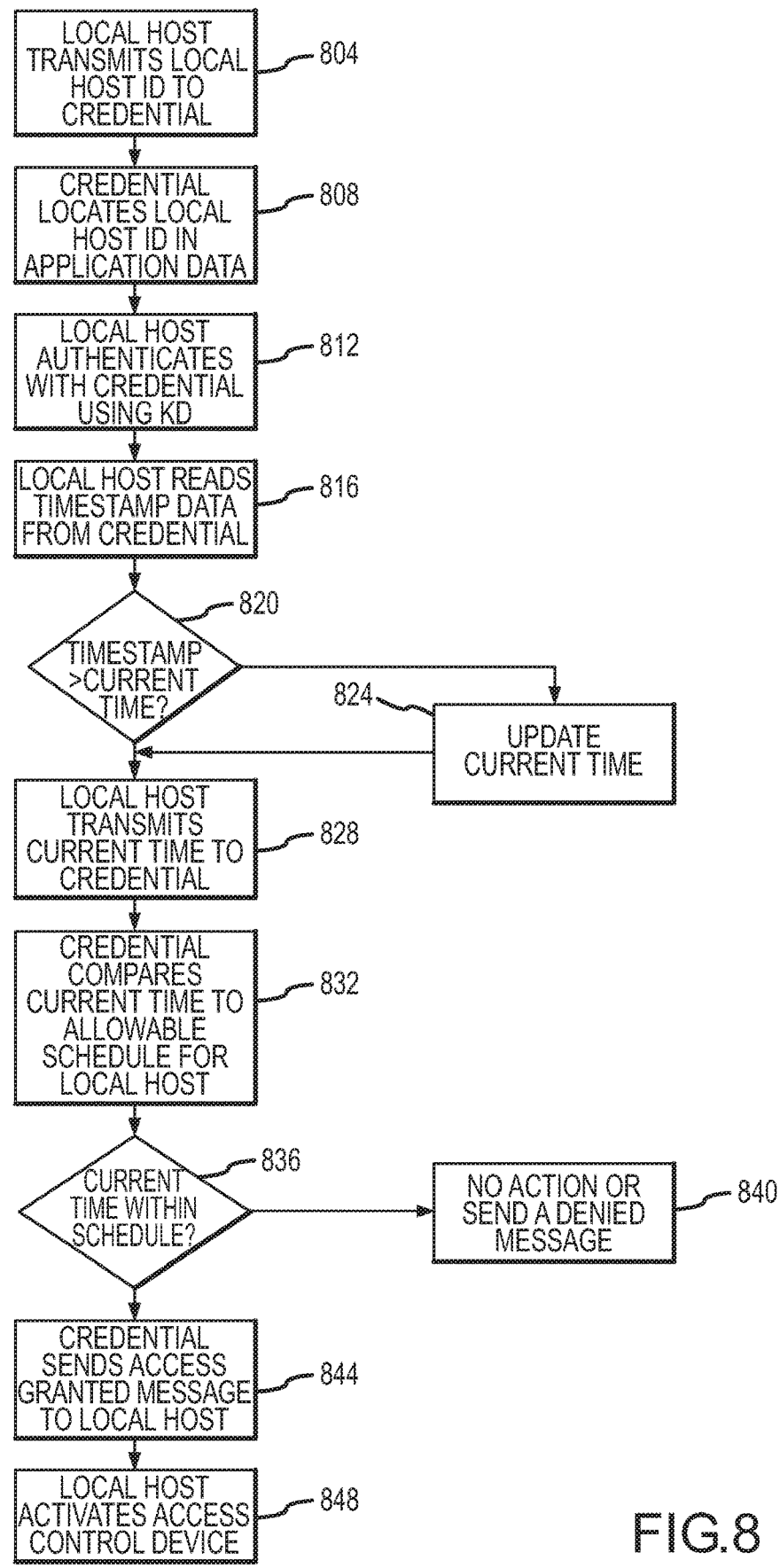
FIG. 8 depicts a method of operating a local host in accordance with embodiments of the present invention.

With reference now to FIG. 8, a method of operating a local host 220 will be described in accordance with at least some embodiments of the present invention. Initially, when a credential 216 is presented to a local host 220, the local host 220 transmits its local host ID 586 to the credential 216 (step 804). The local host ID 586 uniquely identifies the local host 220 or the application employed by the local host 220 to the credential 216. Upon receipt of the local host ID 586, the credential 216 locates the local host ID 586 in its application data 416 (step 808). More specifically, the credential 216 identifies that the local host ID 586 is being used in connection with the access decision application 416 and the control schedules 532, 544 of each set of application data is searched for a matching local host ID 586. When the local host ID 586 is found, the control key KD 528, 540 is pulled from the corresponding set of application data. The chosen control key KD 528, 540 is used by the credential 216 to authenticate with the local host 220 (step 812).

After the credential 216 and local host 220 have mutually authenticated with one another, the local host 220 reads the timestamp data 556 from the credential 216 (step 816). The local host 220 uses the timestamp 556 to determine if its own current time 594 is way off from the actual time (assuming the timestamp 556 accurately reflects actual time). The local host 220 can use the timestamp 556 to perform an option step where the local host 220 checks to see if the timestamp 556 is greater than the current time 594 (step 820). The optional step 820 is provided as a check to ensure that the local host 220 clock is not running too slow. In the event that the timestamp 556 is greater than the current time 594, then the local host 220 updates its current time 594. The assumption behind the local host 220 updating its time to match the time from the timestamp 556 is because the credential 216 is able to communicate with networked devices such as a reader/writer 212 that receive their current time from a live and presumably more accurate source such as the Internet. Therefore, the credential 216 timestamp 556 can be updated whenever it is presented to a networked device.

Once the current time 594 is updated or determined to be accurate, the local host 220 transmits the current time 594 to the credential 216 (step 828). The credential 216 then uses the access decision application 416 to compare the received current time against the control schedule 532, 544 for the appropriate application (step 832). After running the access decision application 416 the credential 216 determines whether it is allowed to access the asset protected by the local host 220. In other words, the access decision application 416 determines whether the current time 594 is within the control schedule 532, 544 for the asset associated with the local host (step 836). In other words, the access decision application 416 may determine if access is granted to the local host 220 as well as specify that access is currently allowed for the local host 220 to which the credential 216 is presented. If the current time is not within the control schedule 532, 544 (i.e., the credential 216 is not allowed access to the asset), then no action is performed or the credential 216 sends a denied access message to the local host 220 (step 840). On the other hand, if the credential 216 determines that it should be allowed access to the asset based on the analysis of the control schedule 532, 544, then the credential 216 sends an access granted message to the local host 220 (step 844). Upon receipt of the access granted message, the local host 220 activates an access control device 312 permitting the holder of the credential 216 to access the asset (step 848). The activation of the access control device 312 may include unlocking a lock, releasing a latch, or permitting access to a financial or electronic file.

Figure 9:
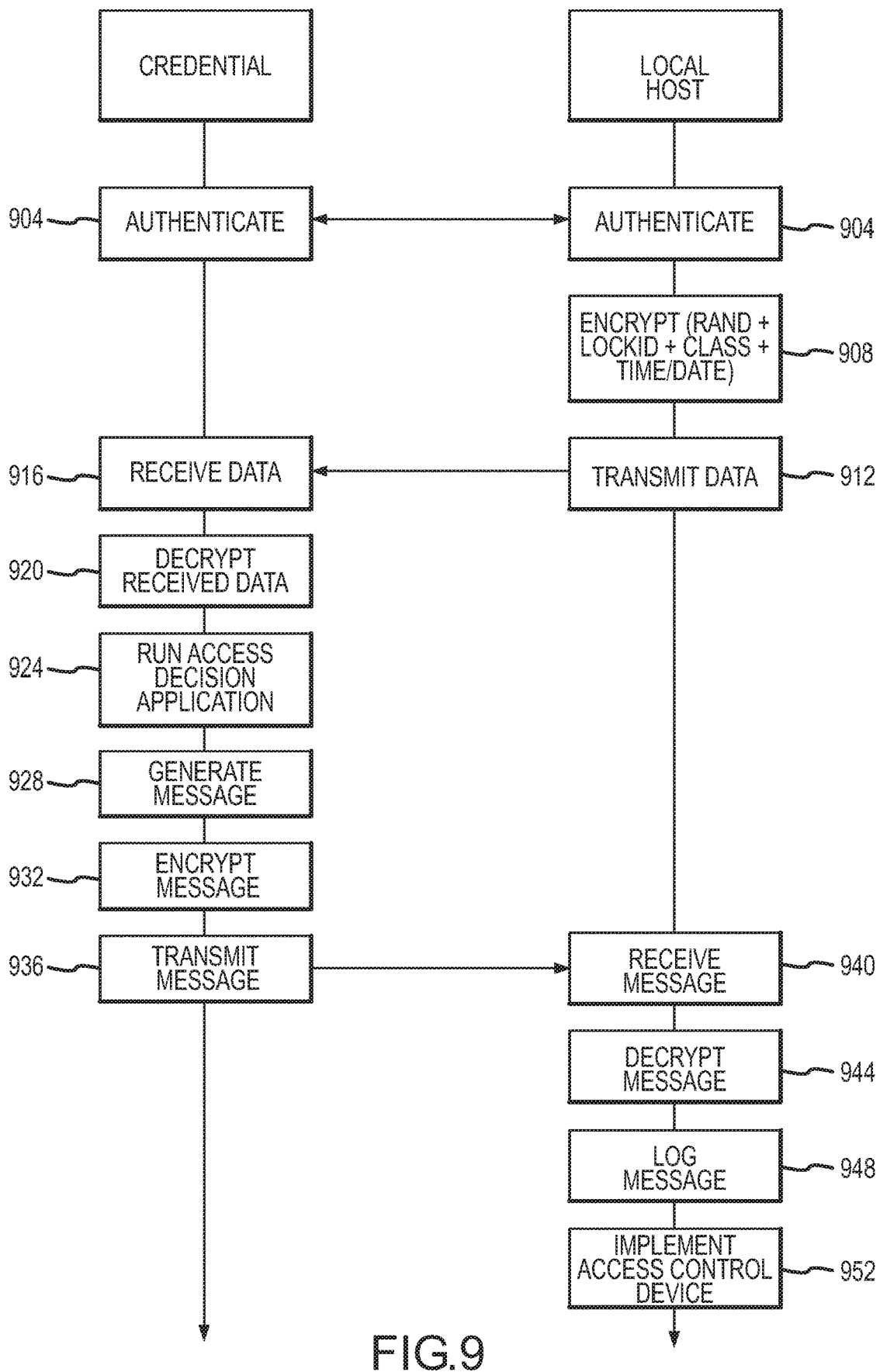
FIG. 9 depicts a method of authenticating a credential with local host in accordance with embodiments of the present invention.

FIG. 9 depicts a communications diagram between a credential 216 and a local host 220 in accordance with at least some embodiments of the present invention. Initially, the credential 216 and local host 220 mutually authenticate with one another (step 904). After mutual authentication has occurred, the local host 220 encrypts a number of different pieces of data together into a message (step 908). The encrypted data may include a random number (Rand), the local host ID 586 (LockID), and current time information. After the message and its contents are properly encrypted, the local host 220 transmits the encrypted message (step 912).

In step 916, the encrypted message is received by the credential 216. After the credential 216 receives the encrypted message it passes the message to the controller 408 where the message is decrypted (step 920). Any known type of encryption/decryption scheme, whether symmetric or asymmetric, may be employed to protect the message during transmission.

After the message has been decrypted, the controller 408 runs the appropriate access decision application 416 (step 924), as the memory may contain multiple access decision applications. Part of running the access decision application 416 generally includes making an access decision and generating a message consistent with the decision (step 928). For example, if an access granted decision is made by the credential 216, then a grant access message is generated. Alternatively, if an access denied decision is made by the credential 216, then a deny access message is generated. The controller 408 then encrypts the contents of the message according to either the same encryption protocol that was employed by the local host 220 or a different encryption protocol (step 932). Thereafter, the controller 408 sends the encrypted message to the communication interface 404 for transmission (step 936).

The message transmitted by the credential 216 is subsequently received by the local host 220 (step 940). After the message is received, the controller 308 decrypts the message (step 944). Thereafter, the contents of the decrypted message are stored in memory 216 of the local host 220 (step 948). Of course, the contents of the message may have also been stored in the log file 552 of the credential 216 prior to transmission of the message.

The local host 220 then sends a control signal to the access control device 312 causing the access control device 312 to act in accordance with the access decision made by the credential 216 (step 952). In other words, if the credential 216 decided that access should be granted, then the access control device 312 is manipulated such that access to the asset protected by the local host 220 can be obtained. However, if the credential 216 decided that access should be denied, then the access control device 312 is manipulated or left alone such that access to the asset is denied.

In accordance with other embodiments of the present invention, the credential 216 may have access to a positioning satellite signal. In such an embodiment, the credential 216 can infer what local host 220 it is talking to based on its known position. This eliminates the requirement of the local host 220 providing a local host ID to the credential 216. The satellite may also provide the current time to the credential 216 such that the credential 216 could make an access decision without receiving any information from the local host 220. Mutual authentication and an access decision message transmission from the credential 216 to the local host 220 would be the only communications required between the credential 216 and the local host 220.

In other alternative embodiments, the application data is protected with a public-key cryptography using an asymmetric key Ka unique to a particular application. The key Ka would be shared with the privilege server 204. Alternatively, the key is a symmetric key diversified from a master key. In such a scheme, the privilege server 204 knows public information such as a User ID 524. The secret diversified key is derived from the public information using a hash or encryption algorithm with a secret master key known only to the privilege server 204. The diversified key is pre-calculated and stored on the credential 216 and calculated by the privilege server 204 during authentication.

In one embodiment, the authentication is performed on a static or rolling message exchanged between the credential 216 and the reader/writer 212 or local host 220. In another embodiment, the reader/writer 212 or local host 220 could have a random number generator that would be used to create a random message to use in the authentication.

In another embodiment, the user ID 524 assigned for a particular application is replaced with the credential ID 504, which could be read and cross-referenced with the user information for the purpose of assigning privileges.

In another embodiment, the reader/writer 212 or local host 220 could also be equipped with a secondary authentication device that requires a personal identification number (PIN). Either the credential 216 would read the PIN and compare it with a stored value as part of the access decision or the credential would transmit its stored value to the reader so that the reader could compare PIN values as part of the access decision.

In still another embodiment, biometric identification information can be stored on the credential and compared to a live scan biometric identification obtained either by the credential or transmitted from an external scanner. The credential 216 performs a match between the stored and live scan biometric data and uses the positive or negative comparison as part of the access decision. Alternatively, authentication is performed using a session key transported to the local host 220 by the credential 216 using a Kerberos scheme.

In accordance with one embodiment of the present invention, the control schedule 532 uses an area control scheme requiring the credential 216 to track its recent usage history. In an area control scheme a pair of area numbers is associated with the local host 220. For example, each local host 220 is a portal permitting egress from one area, and ingress to another area. This area control information is written to the credential 216 by the validation server 208 and may be in the form of last area entered and/or a timestamp from the access granting event to the last area entered.

In yet another embodiment where the local host 220 does not have access to a clock, the application data may contain a counter that permits a specified number of accesses with a given local host ID 586. The number is counted down each time that access is given for local host ID 586 and the permission is denied after the counter reaches a lower limit, such as zero. Alternatively, the credential 216 may be set to expire by means of a decay constant. The decay constant could be electric charge leaving a capacitor or battery, magnetic field, or other means that can be detected and reset.

In still another embodiment, the application data is stored on the credential 216 in a structured order, for example a door list in column 1, a two-man-rule name list in column 2, and other information in column 3 and so on. Then a filter that is coded to read data from a given column/row on the credential 216 may be stored on the local host 220. This template contains no other information other than which row and column to read from a credential 216. This template can be stored on the local host 220 memory 316. In use for decision-on-card, the template will be read by the credential 216 and the identified information will be used in making the access decision.

As can be appreciated by one skilled in the art, additional applications may be employed using a credential 216 that is capable of making its own access decisions. In one embodiment, the credential 216 may be used for loyalty programs that, for example, offer a free or discounted product or service after a prescribed number of products or services have been purchased.

Two-Man-Rule on Reader

The two-man-rule controls access to sensitive areas where a minimum of two people are required at all times. Most of the logic is contained in the reader/writer 212 or local host 220. The access control device 312 is normally locked and two valid credentials 216 are presented for entry. Either two readers can be used to ensure near simultaneity or a single reader can be used to read two credentials 216 in temporally close succession. The reader notes that two valid credentials 216 have been read and then once the access control device 312, such as a door, has been opened and closed, a reader on the opposite side of the door must again read the same two credentials 216 to ensure that both users entered. Once two users are in the secure area, additional valid users are allowed access. Exiting the secure area follows the same procedure in reverse where the last two people must exit together or where no single individual is permitted to remain in the searched area. Any violation of the procedure will set off an alarm. Log files may be kept on both the reader and the credentials 216. The information stored on the credential 216 can include the identification of other credentials 216 used to enter the room during the same time period. This method requires that the reader has a way of detecting that the door or similar access control device 312 has been closed and locked.

Two-Man-Rule on Credential

An alternative approach is to put the two-man-rule on the credential 216. In one embodiment, two valid credentials 216 are presented to an outside reader. The credential 216 recognizes that the reader uses two-man-rule and the reader has to cooperate with the credentials 216 by providing information to the second credential 216 that a valid first credential 216 has just been read. The reader can be programmed to use the two-man-rule by transmitting the timestamp of the most recently read valid credential 216 and by having the ability to interpret two different control commands from the credential 216. One possible control command is that the credential 216 is valid but without the command to unlock the door. This occurs when a credential 216 verifies that it is valid, but that the timestamp received from the reader of the most recent valid credential 216 is too old (for example more than five seconds). The second control command, for example, is to unlock the access control device 312. This occurs when the credential 312 verifies that it is valid and that the timestamp from the most recently read valid credential 312 is within the allowed time period defined in the two-man-rule. An example two-man-rule is shown as follows:

1) The first valid credential 216 sends a message to the reader that it is valid and the reader does not immediately unlock the door but instead waits for a second valid credential 216.
2) The second credential 216 receives information from the reader a first credential 216 has just been validated.
3) The second credential 216 has information that this door uses two-man-rule and should, after receiving information about the first valid credential 216, check its own validity with a positive check resulting in the credential 216 sending a control command for the access control device 312 to be unlocked or released.

Multi-Device

In accordance with some embodiments of the present disclosure, a plurality of credentials 216 presented by the same user are utilized to make an access control decision. Particularly with the relatively recent (and still ongoing) proliferation of cellular phones and portable computers, more and more individuals carry two or more devices that may be used as credentials 216. In many instances, for example, an individual may have both a cellular phone (which may be a smart phone) and a portable computer (which may be a wearable computer, e.g. a watch, wristband, glasses, jewelry, shoes, hair accessories, clothing, or any other wearable item incorporating a processor and memory) that may be used as credentials 216, while in other instances, an individual may have some other combination of devices capable of use as credentials 216. Accordingly, in some embodiments of a secure access system 200, the access control decision involves two or more credentials 216 belonging to the same individual.

Several exemplary implementations of duality are described below without any intent to exclude other implementations. In at least some embodiments, each of two credentials 216 stores the same application data (or the same types of application data, e.g. a control key, a control or access schedule, and an expiration time) in a memory 412, while in other embodiments, each of two credentials 216 stores complementary application data in a memory 412. At least one of the credentials 216 stores an access decision application 416. Each credential may also store a credential ID 504 in a memory 412.

In embodiments where each credential 216 stores the same application data (or the same types of application data) in memory 412, each credential 216 is presented to a local host 220. The steps identified in FIG. 8 and the accompanying description are then followed, except that once the second credential 216 completes step 836, it sends a message to the first credential 216 indicating successful validation. Similarly, once the first credential 216 completes step 836, it waits to send an access granted message to the local host 220 (step 844) until after it has received a successful validation message from the second credential 216. The first and second credentials 216 may complete steps 804-836 serially or in parallel. If either credential 216 is determined not to be valid, then the first credential 216 does not send an access granted message to the local host 220.

If only the first credential 216 is running an access decision application 416, then for any of steps 804-836, the second credential 216 may send information required by the access decision application 416 to the first credential 216, so that the access decision application 416 can make a validity determination regarding the second credential 216. Alternatively, the first credential 216 running the access decision application 416 may query or read the second credential 216 to obtain information needed for the access decision application 416 to make an access decision. In at least some embodiments, the second credential 216 is not specially configured for use in a duality situation.

To the extent information from the local host 220 is needed to make a validity determination regarding the second credential 216, that information may be communicated directly from the local host 220 to the first credential 216 for use by the access decision application 416, or it may be communicated from the local host 220 to the second credential 216, and then from the second credential 216 to the first credential 216 for use by the access decision application 416. Once the access decision application 416 verifies that each credential 216 is valid, then it sends an access granted message to the local host 220. If the access decision application 416 determines that one or both of the credentials 216 is not valid, then no access granted message is sent.

In at least some embodiments, where each credential 216 is running an access decision application 416, each credential 216 may send an access granted message to the local host 220, and the local host 220 may be configured to grant access only after receiving an access granted message from each credential 216. In some embodiments, one or both of credentials 216 may be configured to generate an access granted message only after verifying, for example, the presence and/or identity of the other credential 216. In some embodiments, the access granted message(s) sent by one or both of the credentials 216 may reference the other credential 216 (e.g., by credential ID, by including information from or about the other credential 216, by including a hash or checksum calculated using information from or about the other credential 216 as an input, or in some other manner). In these ways, the local host 220 can confirm that it has received access granted messages from two credentials 216 associated with the same user, rather than from two credentials 216 each associated with a different user.

Alternatively, the local host 220 may send a time-based counter (e.g., the same counter) to the credentials 216 for a limited period of time, such as 10 seconds, or the local host 220 may send a nonce to the credentials 216. Then, the access granted messages sent by the credentials 216 may be required to include that counter or nonce (or a hash thereof) so that the local host can verify that the proper counters or nonce values have been returned. In this way, the local host 220 can determine, for example, the temporal binding of the two access granted messages. Of course, if either credential 216 is determined not to be valid, then the invalid credential 216 does not send an access granted message, and the local host 220 does not grant access even if it receives an access granted message from the other credential 216.

In still other embodiments, a first credential 216 requires information about the local host 220 (as described previously herein) and information from or about a second credential 216 in order to make an access decision. The information from or about the second credential 216 may be the information needed to evaluate whether the second credential 216 is valid, as in the embodiments described above (e.g. a control key, a control or access schedule, and an expiration time). Alternatively, the information from or about the second credential 216 may be information that a user must enter into the second credential 216 using an input device on the second credential 216 (e.g. a keyboard, touchscreen, microphone, fingerprint reader, etc.), such as a password, PIN, biometric identification information, etc. Once the user enters the required information into the second credential 216, the second credential 216 may send the information directly to the first credential 216 to be evaluated by the access decision application 416 of the first credential 216. Or, an access decision application 416 running on the second credential 216 may use the information input by the user to determine whether the second credential 216 is valid, which determination is then reported by the second credential 216 to the first credential 216. In still other embodiments, the information from or about the second credential 216 may be information about a selection made by the user from among several options presented to the user through the second credential 216 (e.g., validation of the second credential 216 may require that the user select a predetermined one of a plurality of pictures displayed on a graphical user interface of the second credential 216), or it may be information gathered from one or more sensors (e.g. an accelerometer, a GPS or other location sensor, a light sensor, a thermometer, etc.) on the second credential 216 (e.g., validation of the second credential 216 may require that the second credential 216 be moved in a predetermined way, or that the second credential 216 be in a certain position).

In other embodiments, a first credential 216 may be used for steps 804 through 836 of the method of FIG. 8, but instead of sending an access granted message to local host 220 upon reaching step 844, the first credential 216 may send a message to a second credential 216 that causes the second credential 216 to initiate and/or complete the steps of FIG. 8, including the sending of an access granted message to the local host (step 844).

Rather than store the same application data (or the same types of application data), the first and second credentials 216 may store complementary application data. Thus, for example, the first credential 216 may store a control key but no control or access schedule, and the second credential 216 may store a control or access schedule but no control key. When an access decision must be made, the first credential 216 provides the control key to the second credential 216, and the second credential 216 provides the control or access schedule to the first credential 216, such that each credential 216 has the information needed to make a validity determination. Once each credential 216 completes the validity determination, one or both of the credentials 216 communicates the validity determination to the other credential 216, and if both credentials 216 are valid, then one of the credentials 216 sends an access granted message to the local host 220. Or, if the local host 220 is configured to require an access granted message from each credential 216, as in the example above, then each credential 216 provides an access granted message upon successful validation.

Alternatively, instead of each credential 216 completing a validation process substantially independently (albeit using information received in part from the other credential 216), only one of the credentials 216 may be configured to complete the validation process. For example, the first credential 216 may complete the validation process using information obtained from the local host 220, as described in FIG. 8 and the accompanying description, and also using information obtained from the second credential 216. The information obtained from the second credential 216 may be, as non-limiting examples, a control key, a control or access schedule, an expiration time, a credential ID, or a hash or checksum of any of the foregoing. In at least some embodiments, the first credential 216 may use any known cryptographic technique, such as challenge response (e.g. with signature) to prove the presence of the second credential 216. In this manner, communication between the credentials 216 is required, but the local host need only communicate with the first credential 216.

First and second credentials 216 may communicate with each other via any known communication protocol, including, as non-limiting examples, Bluetooth™, Bluetooth low energy (BLE), near-field communication (NFC), WiFi, ZigBee, infrared, sound, light, etc. In some embodiments, communication between first and second credentials 216 may be restricted to short-range communication protocols, such as NFC, to ensure that both credentials 216 are actually in relatively close proximity (e.g. on a user's person). Alternatively, a proximity requirement may be enforced by requiring that each credential 216 communicate independently with the local host 220 using a short-range communication protocol.

While the embodiments described above use two credentials 216, other embodiments use three or more credentials 216 to make an access decision. Additionally, while in the above embodiments the successful validation of the credentials 216 results in the sending of one more access granted messages to the local host 220, other messages may be generated and sent instead, including commands to open or close a door or other portal (which may or may not have the same result as sending an access granted message) and/or any other commands that may be useful or appropriate for the system in question.

Figure 10:
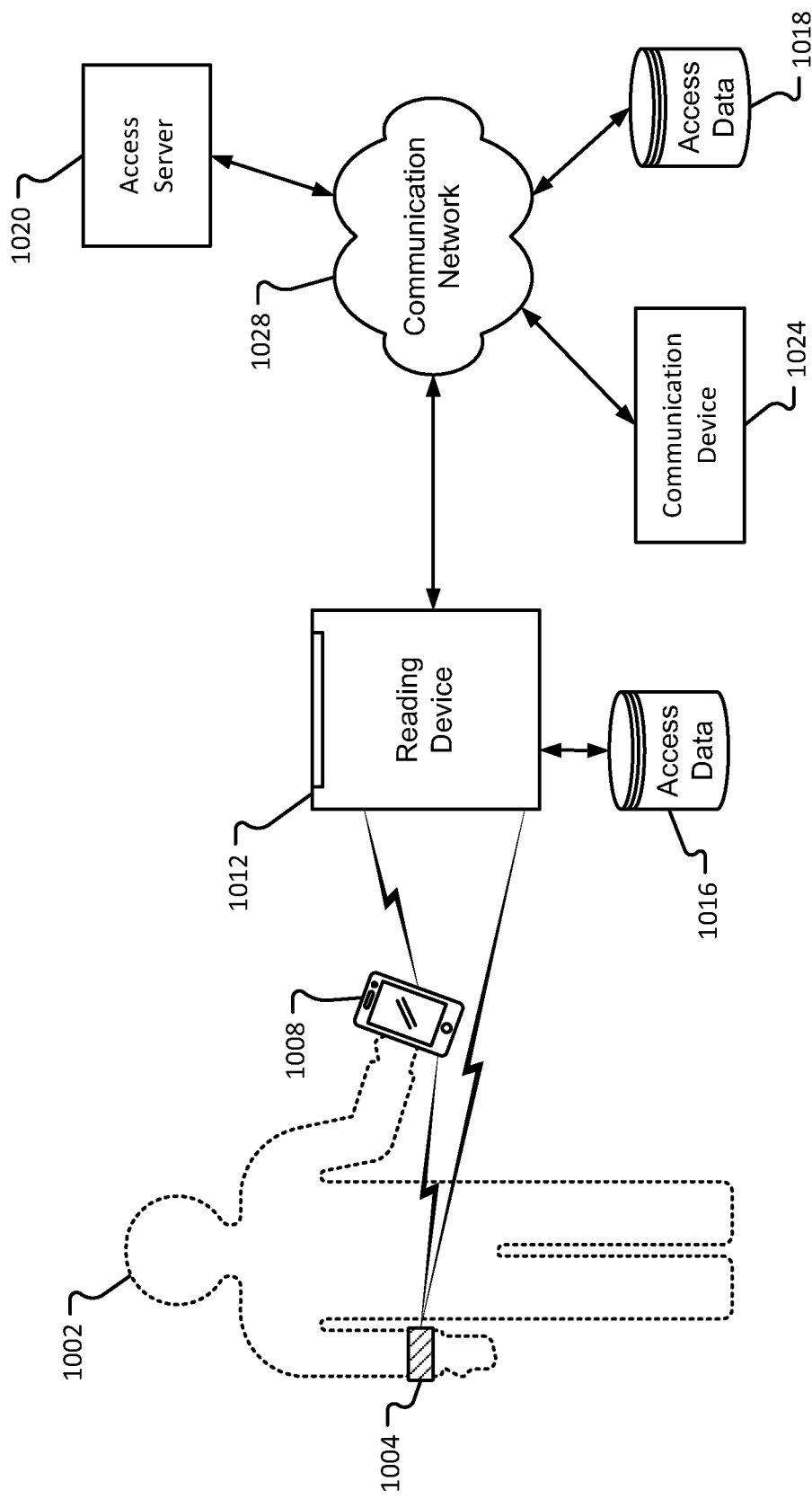
FIG. 10 is a diagram of a system according to some embodiments of the present disclosure.

With reference now to FIG. 10, a user 1002 holds two credentials 1008 and 1004, each of which may have the same or similar components as a credential 216. In this embodiment, the credential 1008 is a smart phone, and the credential 1004 is a wearable device, specifically a smart watch. The credentials 1004 and 1008 are configured to communicate with each other and with a reading device 1012 across one or more wireless communication connections. These one or more wireless communication connections can include communications via at least one of conventional radio protocols, proximity-based wireless communication protocols, Bluetooth™, BLE, infrared, audible, NFC, RF, and other wireless communication networks and/or protocols. In some cases, communications between the wearable device 1004 and/or the smart phone 1008 and the reading device 1012 may be established automatically when the wearable device 1004 and/or the smart phone 1008 enters an active zone of an interrogating reading device 1012. In one embodiment, the active zone of the reading device 1012 may be defined as a three-dimensional space where the intensity of RF signals emitted by the reading device 1012 exceeds a threshold of sensitivity of the wearable device 1004/smart phone 1008 and the intensity of RF signals emitted by the wearable device 1004/smart phone 1008 exceeds a threshold of sensitivity of the reading device 1012.

The reading device 1012 may have the same or similar components as the reader 212. The reading device 1012 may also include an access data memory 1016. The access data memory 1016 may be configured to store access information, identification data, rules, program instructions, and/or other data associated with performing access operations of the access control system of which it is a part. In some embodiments, the reading device 1012 may be configured to communicate with an access data memory 1018 across a communication network 1028. The access data memory 1018 may be located remotely, locally, and/or locally and remotely, from the reading device 1012.

In some embodiments, the credentials 1004 and 1008 may be configured to communicate with a reading device 1012 across a communication network 1028. The communication network 1028 can include communication via at least one of conventional radio networks, wireless communication networks, Zig-Bee, GSM, CDMA, WiFi, and/or using other communication networks and/or protocols as provided herein.

In some embodiments, authentication may be required between the wearable device 1004 and/or the smart phone 1008 and the reading device 112 before further communications are enabled. Additionally or alternatively, authentication may be required between the wearable device 1004 and the credential 1008 before further communications are enabled. In any event, the further communications may provide communications in which access control information (e.g., keys, codes, credentials, etc.) are shared. In some embodiments, the authentication may be provided via one-way or mutual authentication. Examples of authentication may include, but are not limited to, simple authentication based on site codes, trusted data formats, shared secrets, and/or the like. As can be appreciated, access control information is more sensitive and may require more involved validation via, for example, an encrypted exchange of access control information.

The access server 1020 may include a processor, a memory, and one or more inputs/outputs. The memory of the access server 1020 may be used in connection with the execution of application programming or instructions by the processor, and for the temporary or long term storage of program instructions and/or data. As examples, the memory may comprise RAM, DRAM, SDRAM, or other solid state memory. Additionally or alternatively, the access server 1020 may communicate with an access data memory 1018. Like the memory of the access server 1020, the access data memory 1018 may comprise a solid state memory or devices. The access data memory 1018 may comprise a hard disk drive or other random access memory.

In some embodiments, the reading device 1012 may be configured to communicate with one or more devices across a communication network 1028. For example, the reading device 1012 may communicate with the credential 1004 and/or the credential 1008 across the communication network 1028. Among other things, this communication can allow for back-end authentication and/or provide notifications from the reading device 1012 to the credentials 1008 and/or 1004. The communication network 1028 may comprise any type of known communication medium or collection of communication media and may use any type of protocols to transport messages between endpoints. The communication network 1028 may include wired and/or wireless communication technologies. The Internet is an example of the communication network 1028 that constitutes an Internet Protocol (IP) network consisting of many computers, computing networks, and other communication devices located all over the world, which are connected through many telephone systems and other means. Other examples of the communication network 1028 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, RS-232, similar networks used in access control systems between readers and control panels, and any other type of packet-switched or circuit-switched network known in the art. In addition, it can be appreciated that the communication network 1028 need not be limited to any one network type, and instead may be comprised of a number of different networks and/or network types. Moreover, the communication network 1028 may comprise a number of different communication media such as coaxial cable, copper cable/wire, fiber-optic cable, antennas for transmitting/receiving wireless messages, and combinations thereof.

In some embodiments, an access control system such as that depicted in FIG. 10 may include at least one communication device 1024. A communication device 1024 may include, but is not limited to, a mobile phone, smartphone, smart watch, soft phone, telephone, intercom device, computer, tablet, mobile computer, alarm, bell, notification device, pager, and/or other device configured to convert received electrical and/or communication signals. In one embodiment, the communication device 1024 may be used to receive communications sent from the wearable device 1004 and/or the smart phone 1008 via the reading device 1012.

As described above with respect to the use of multiple credentials 216 in making an access control decision, the user 1008 presents his or her credentials 1004 and 1008 to the reading device 1012, and both credentials 1004, 1008 are then used to determine whether to grant access to the user 1002. In embodiments, each credential 1004, 1008, in combination with the reading device 1012, executes some or all of the steps of depicted in FIG. 8 to determine whether each credential is valid. Additionally, the credentials 1004, 1008 communicate with each other so that one or both of the credentials 1004, 1008 can determine whether the other credential 1008, 1004 is valid. Once one or both of the credentials 1004, 1008 (depending on whether either or both of the credentials 1004, 1008 has been predetermined to make an access control decision) makes an access control decision, that decision is sent to the reading device 1012, which then activates an access control device to grant access (if the access control decision was an access granted decision) or does nothing or sends an access denied message (if the access control decision was an access denied decision).

Figure 11:
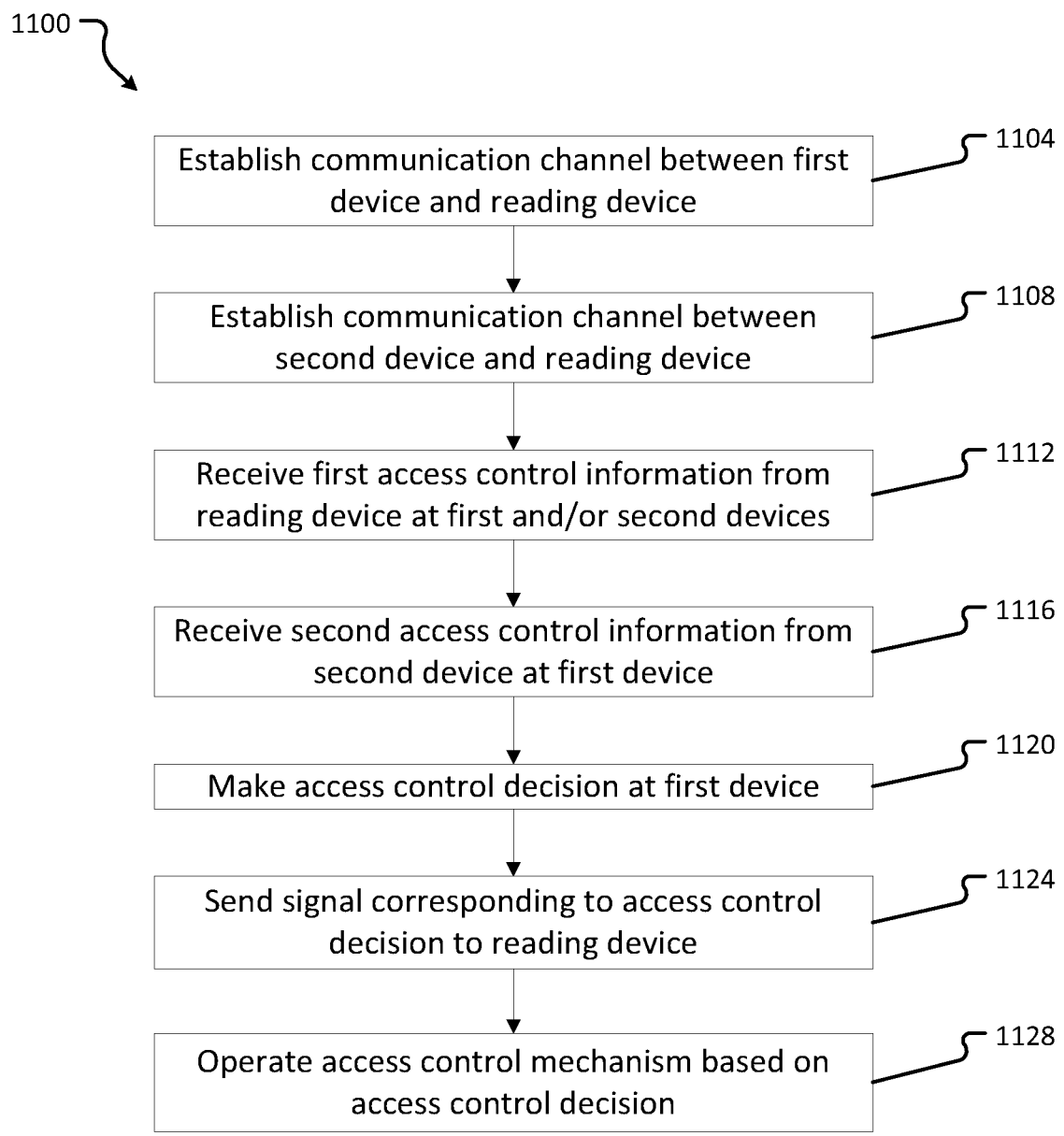
FIG. 11 is a flowchart of a method according to other embodiments of the present disclosure.

With reference now to FIG. 11, a method 1100 according to embodiments of the present disclosure includes establishing a communication channel between a reading device 1012 and a first device (e.g. credential 1008) (step 1104), as well as establishing a communication channel between the reading device 1012 and a second device (e.g. credential 1004) (step 1108). The communication channels may utilize any suitable protocol described herein, including, without limitation, Bluetooth™, BLE, infrared, audible, NFC, RF, WiFi, Zig-Bee, GSM, and/or CDMA. The communication channels may be established in response to receipt of a signal from the reading device 1012 by one or both of the first and second devices, or in response to receipt of a signal from one or both of the first and second devices by the reading device 1012. The communication channels may also be established in response to some other trigger, such as a determination by one or both of the first and second devices of being in proximity to the reading device 1012 (whether such determination is based on information received from a location sensor, information stored in a memory of the first and/or second devices, signals received from a device other than the reading device 1012, or any other available information). Additionally, establishing the communication channels may comprise completing an authentication process between the first device and the reading device 1012, and between the second device and the reading device 1012. The authentication process may be any known authentication process, including any authentication process described elsewhere herein.

The method 1100 also comprises the step 1112 of receiving first access control information at one or both of the first device and the second device from the reading device 1012. The first access control information may comprise, without limitation, an identification number, a time stamp, a schedule, and/or a combination of any of the foregoing. The first access control information may also be or include any other information that is used by one or both of the first and second devices to make an access control decision. Additionally, the first access control information may be encrypted, and the encryption may also be used by one or both of the first and second devices as part of making the access control decision.

In step 1116, the first device receives second access control information from the second device. The second access control information received in this step may be the same as or different than the first access control information received from the reading device 1012 in step 1112. In embodiments, the second access control information includes a mobile key, an identification code, a serial number, and/or any other information used by the receiving device to make an access control decision. The second access control information may include the first access control information, a subset of the first access control information, and/or information based on the first access control information. Like the first access control information, the second access control information may be encrypted, and the encryption may also be used by the first device as part of making the access control decision.

In step 1120, the first device makes an access control decision. The decision may be based on the first access control information, the second access control information, and/or information stored in the memory of the first device. The foregoing possibilities include the possibility that the access control decision is based on the second access control information, which is in turn based on the first access control information. The access control decision may be made, for example, by an access decision application running on the first device. The access control decision may be a decision to grant access to the holder of the first and second devices, or it may be a decision to deny access to the holder of the first and second devices.

In step 1124, the first device transmits a signal or message to the reading device 1012 containing the decision or information corresponding to the decision. The signal or message may be transmitted directly from the first device to the reading device 1012, or it may be transmitted indirectly. For example, the signal or message may be transmitted from the first device to the second device that made the access control decision, and from that device on to the reading device 1012. The signal or message may be encrypted to prevent eavesdroppers from copying, recording, and/or using the signal or message without authorization.

In step 1128, the reading device 1012 operates an access control mechanism based on the received signal or message. Thus, if the received signal or message corresponds to an access granted decision, then the reading device 1012 operates the access control mechanism to grant access to a protected resource to the holder of the first and second devices. If the received signal or message corresponds to an access denied decision, on the other hand, then the reading device 1012 operates the access control mechanism to deny access to the protected resource. The latter may include doing nothing, if the access control mechanism is already in a state that prevents access to the protected resource. Operating the access control mechanism to deny access to the protected resource may also comprise causing the access control mechanism to provide an indication that access has been denied, and/or to activate an alarm.

The steps of the method 1100 as described above, although presented in a particular order, need not be executed in the order presented. Additionally, methods according to embodiments of the present disclosure may include more or fewer steps than those identified in method 1100. For example, the second device may receive third access control information from the first device, which third access control information may be the same as or different than the first and/or second access control information. Additionally, the second device may make a second access control decision, and may send a signal or message corresponding to that second access control decision to the first device and/or to the reading device. The first device may send a signal or message to the second device that corresponds to the access control decision. The first device, the second device, and/or the reading device may compare the access control decision made by the first device with the second access control decision made by the second device, and may, for example, grant access only if the access control decision made by the first device is the same (e.g. access granted or access denied) as the access control decision made by the second device. These and other variations on the method 1100 are within the scope of embodiments of the present disclosure.

Man-Trap

A man-trap provides security against piggybacking. The configuration requires two doors on either side of a vestibule area and each door having a reader on both the inside and outside of the area. Both doors are normally locked and are generally unlocked in a specified order. Normal operation requires that readers on both doors are able to detect if either of the other doors are closed and locked or open. In normal operation, a credential 216 is presented to a first reader outside the enclosed area on or near the first door. A valid credential 216 will unlock this first door allowing the person to enter the vestibule. The first door closes and locks before the second door can be unlocked. After the first door is closed and locked the credential 216 can be presented to the second door and, if valid, the second door will unlock.

Pseudo Man Trap

A pseudo-man-trap can be implemented on non-networked readers. With non-networked readers, the second door is unaware of whether or not the first door is closed and locked or is open; therefore, it cannot be required to remain locked while the first door is open or unlocked (this may be overcome by a local wired or wireless network). Similar results can be obtained by using the credential 216 to carry a message from the first door to the second door regarding its lock-status. The operation of a pseudo-man-trap is described as follows:

1) The credential 216 is presented to the outside reader of the first door and if valid the door is unlocked.
2) After entering the enclosure and waiting for the door to close and lock, the credential 216 is presented to the inside reader of the first door. The card receives a secure message, possibly using a key shared by the two doors, stating that the first door is closed and locked.
3) The credential 216 is presented to the second door and both the credential 216 validation and the first-door-status are checked. If both conditions are satisfied the second door is unlocked.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   presenting a first and/or a second credential to a reader, said reader being associated with an access control system;
   said reader transmitting data comprising at least one of a host identifier and timestamp to the first and/or second credential;
   analyzing, with the first and/or second credential, the at least one of a host identifier and timestamp;
   making an access control decision based on the analysis of the at least one of a host identifier and timestamp, the access control decision comprising a determination as to whether or not the first and/or second credential is allowed access to an asset protected by said reader;
   generating, with the first and/or second credential, a first message containing results of said access control decision; and
   sending, with the first and/or second credential, said first message to said reader.

2. The method of claim 1, wherein the data transmitted by the reader further comprises at least one of a PIN, a password, biometric identification information, a user selection, and information gathered from one or more sensors.

3. The method of claim 1, further comprising: said reader transmitting results of said access control decision to an access controller.

4. The method of claim 3, wherein said access controller comprises at least one of a lock for an individual door, a lock for a computer system, a lock for a computer, and a lock for a database.

5. The method of claim 3, wherein said access control decision comprises a grant of access to an asset associated with said access control system, the method further comprising: said access controller granting a user of the first and/or second credentials access to said asset; and said reader saving content of said first message in a log.

6. The method of claim 3, wherein said access control decision comprises a denial of access to an asset associated with said access control system, the method further comprising: said access controller denying a user of the first and/or second credential access to said asset; and said reader saving content of said first message in a log.

7. The method of claim 1, wherein said first message is encrypted prior to being sent to said reader.

8. The method of claim 1, wherein the data transmitted by the reader further comprises at least one of a control key, a control or access schedule, and an expiration time.

9. The method of claim 1, wherein said reader is a non-networked reader.

10. The method of claim 1, further comprising performing authentication between said reader and the first and/or second credential prior to said reader transmitting data to the first and/or second credential.

11. The method of claim 1, wherein the first credential is a wearable device comprising a processor and memory.

12. An access control system, comprising:
   at least one local host for controlling access to an asset; comprising first credential, comprising:
   a memory for storing an access decision application that is capable of making an access decision for the first credential based on data received, either directly or indirectly, from the at least one local host, the access decision comprising a determination as to whether or not the first credential and/or a second credential is allowed access to the asset protected by said at least one local host; and
   a processor for executing said access decision application in connection with said received data, wherein said processor is further capable of causing a message to be generated after executing said access decision application and causing said message to be transmitted to the at least one local host, and wherein said message comprises results of said access decision for said credential.

13. The system of claim 12, wherein the second credential is configured to receive the access decision from the first credential and provide the message to the at least one local host.

14. The system of claim 12, wherein said received data comprises at least one of a local host identifier assigned to the at least one local host, authentication information, and a timestamp.

15. The system of claim 12, wherein the at least one local host comprises: a reader for communicating with one or both of the first credential and second credential; and an access control device in communication with said reader, wherein results of said access decisions received at said reader are transmitted to said access control device for performance by the access control device consistent with said access decisions.

16. The system of claim 12, wherein the first credential comprises a contact smartcard, a contactless smartcard, a proximity card, a passport, a key fob, a cellular phone, a portable computer, or a Personal Digital Assistant (PDA).

17. A credential for use in a secure access system, comprising:
a memory for storing an access decision application that is capable of making an access decision based on data received from a local host, the access decision comprising a determination as to whether or not the credential and/or a second credential is allowed access to an asset protected by the local host; and
a processor for executing said access decision application in connection with said received data, wherein said processor is further capable of generating a message after executing said access decision application and causing said message to be transmitted to the local host, and wherein said message comprises results of said access decision for said credential.

18. The credential of claim 17, wherein said data received from the local host comprises at least one of a control or access schedule, a control key, an expiration time, a PIN, a password, biometric identification information.

19. The credential of claim 17, wherein the access decision is made for the second credential only in response to determining that the second credential is within a communication range of the local host or the credential itself.

20. The credential of claim 17, a first wireless communication interface that enables communications with the local host; and a second wireless communication interface that enables communications with the second credential.

\* \* \* \* \*